(12) United States Patent
Glass et al.

(10) Patent No.: US 7,216,242 B2
(45) Date of Patent: May 8, 2007

(54) PERSONAL ELECTRONICS DEVICE WITH APPLIANCE DRIVE FEATURES

(75) Inventors: Timothy J. Glass, Aptos, CA (US); Bryan T. Cupps, Capitola, CA (US)

(73) Assignee: Dualcor Technologies, Inc., Scotts Valley, CA (US)

( * ) Notice: Subject to any disclaimer, the term of this patent is extended or adjusted under 35 U.S.C. 154(b) by 0 days.

(21) Appl. No.: 11/053,780

(22) Filed: Feb. 9, 2005

(65) Prior Publication Data
US 2005/0202846 A1    Sep. 15, 2005

Related U.S. Application Data

(63) Continuation-in-part of application No. 10/158,266, filed on May 30, 2002, now Pat. No. 6,976,180, which is a continuation-in-part of application No. 09/809,963, filed on Mar. 16, 2001.

(51) Int. Cl.
    *G06F 1/26* (2006.01)
    *G06F 1/32* (2006.01)
(52) U.S. Cl. .................. 713/300; 713/320
(58) Field of Classification Search ............... None
    See application file for complete search history.

(56) References Cited

U.S. PATENT DOCUMENTS

| | | |
|---|---|---|
| 5,142,684 A | 8/1992 | Perry et al. |
| 5,280,650 A | 1/1994 | Sobti |
| 5,487,181 A | 1/1996 | Dailey et al. |
| 5,552,806 A | 9/1996 | Lenchik |
| 5,648,760 A | 7/1997 | Kumar |
| 5,696,496 A | 12/1997 | Kumar |
| 5,797,089 A | 8/1998 | Nguyen |
| 5,815,142 A | 9/1998 | Allard et al. |
| 5,983,073 A | 11/1999 | Ditzik |
| 6,240,521 B1 | 5/2001 | Barber et al. |
| 6,434,403 B1 | 8/2002 | Ausems et al. |
| 6,501,999 B1 * | 12/2002 | Cai ........................ 700/82 |
| 6,535,985 B1 | 3/2003 | Oshima et al. |

(Continued)

FOREIGN PATENT DOCUMENTS

| | | |
|---|---|---|
| EP | 0 651 544 A2 | 5/1995 |
| EP | 0 651 544 A3 | 5/1995 |
| GB | 2327558 | 1/1999 |
| WO | WO 99/28812 | 6/1999 |
| WO | WO 00/05641 | 2/2000 |
| WO | WO 00/49731 | 8/2000 |

*Primary Examiner*—James K. Trusillo
*Assistant Examiner*—Stefan Stoynov
(74) *Attorney, Agent, or Firm*—Haynes Beffel & Wolfeld LLP

(57) ABSTRACT

A novel personal electronic device includes a first (embedded) and second (non-embedded) processors including associated operating systems and functions. In one aspect, the first processor performs relatively limited functions, while the second processor performs relatively broader functions under control of the first processor. Often the second processor requires more power than the first processor and is selectively operated by the first processor to minimize overall power consumption. Protocols for functions to be performed by the second processor may be provided directly to the second processor and processed by the second processor. In another aspect, a display controller is designed to interface with both processors. In another aspect, the operating systems work with one another. In another aspect, the first processor employs a thermal control program. Advantages of the invention include a broad array of functions performed by a relatively small personal electronics device.

22 Claims, 33 Drawing Sheets

U.S. PATENT DOCUMENTS

| | | |
|---|---|---|
| 6,553,223 B1 | 4/2003 | Bayley et al. |
| 6,631,474 B1 | 10/2003 | Cai et al. |
| 6,701,161 B1 | 3/2004 | Wendling |
| 6,945,461 B1 * | 9/2005 | Hien et al. .................. 235/451 |
| 2002/0032842 A1 * | 3/2002 | Kawauchi et al. .......... 711/147 |
| 2002/0077161 A1 | 6/2002 | Eromaki |
| 2002/0086719 A1 | 7/2002 | Kedia et al. |
| 2002/0087900 A1 | 7/2002 | Homewood et al. |
| 2002/0103005 A1 | 8/2002 | Watts, Jr., et al. |
| 2002/0103008 A1 | 8/2002 | Rahn et al. |
| 2002/0108064 A1 | 8/2002 | Nunally |
| 2002/0173344 A1 | 11/2002 | Cupps et al. |
| 2003/0041206 A1 | 2/2003 | Dickie |
| 2003/0112585 A1 | 6/2003 | Silvester |
| 2003/0115495 A1 | 6/2003 | Rawson, III |
| 2003/0159026 A1 * | 8/2003 | Cupps et al. .................. 713/1 |
| 2003/0226044 A1 | 12/2003 | Cupps et al. |

* cited by examiner

PERSONAL ELECTRONICS DEVICE WITH APPLIANCE DRIVE FEATURES

RELATED APPLICATIONS

This is a continuation in part of U.S. Ser. No. 10/158,266 filed May 30, 2002 now U.S. Pat. No. 6,976,180, which is a continuation in part of U.S. Ser. No. 09/809,963 filed Mar. 16, 2001, all incorporated herein by reference.

FIELD

The invention pertains to personal electronic devices in the general category of smart handheld devices, personal computers, mobile telephones, and the like.

BACKGROUND

With electronics becoming increasingly more sophisticated, a wide variety of devices has become available to provide users with a tool to help them manage their affairs and improve their ability to communicate with others both at work and in their personal lives. Computers are well known and have taken on a variety of flavors, including portable computers, which can be carried from place to place with relative convenience. Mobile telephones have come into widespread use due to their small size and ease of use and the widespread availability of cellular services in a large portion of the industrialized world. More recently, small computer-like devices with limited computational capabilities have become popular and are often referred to as Smart Handheld Devices or Personal Digital Assistants (PDAs). Such PDAs are typically small hand held devices including a battery, a liquid or digital display (LCD) touchscreen, a small amount of memory (typically on the order of 8 to 16 megabytes of random access memory (RAM)) and a small amount of computer processing capability. Given the small battery size and the limited memory and computational power, such PDAs have typically been used for contact management, scheduling appointments, and email. The common practice of a PDA user is to routinely synchronize his/her PDA with his/her desktop PC computer. This synchronization requirement is awkward and time consuming to maintain.

FIG. 1 is a block diagram depicting a typical prior art cellular telephone, including a battery, a display, a man-machine interface (MMI) and a cellular telephone module that includes radio frequency (RF) circuitry, and a Digital Signal Processor (DSP).

A current trend is to include both PDA functions and cellular telephone functions in a single device. One such device is the HandSpring Visor phone system, which basically takes a HandSpring PDA device and a separate cellular telephone device mechanically attached to the PDA. This device is shown in a block diagram in FIG. 2A in which System 100 includes PDA 101 and an attached Cellular Telephone Module 102. Such a device is somewhat cumbersome and includes two separate batteries, a first for PDA 101 and a second for Cellular Telephone Module 102. Since PDA 101 and Cellular Telephone Module 102 are connected by one or more external interfaces, the communication speeds between PDA 101 and Cellular Telephone Module 102 are relatively limited. These devices are heavy, weighing approximately 10 ounces, and have a bulky form-factor, in that a user must talk into his/her PDA, while holding the PDA with the Cellular Telephone Module attached.

Another approach is to provide a device that serves as both a PDA and a cellular telephone. Such a device is shown by way of example in FIG. 2B and typically includes a Cellular Telephone Module 201 and an LCD display 202, a Processor 204, and a Battery 203. This type of device constitutes basically an advance on cellular telephones, including additional features. Such devices may include the KYOCERA PDO SMART PHONE device that combines CDMA digital wireless telephone technology with PALM® PDA capabilities. The PDQ SMART PHONE device is essentially a telephone that includes a pushbutton pad for making telephone calls. In this device, the pushbutton pad pivots out of the way to reveal a larger LCD screen for use with PDA functions. A similar device is available from Nokia Corporation under the tradename NOKIA 9110 COMMUNICATOR, which appears as a basic cellular telephone including pushbutton keys and which opens up to reveal a larger LCD screen and a mini-keypad with PDA functions.

There are significant problems with PDAs, Internet Appliances (IAs) and cellular telephones. The PDA, IA and cellular telephone metaphors are dramatically different than what users expect in the personal computer (PC) world. They have less powerful CPUs, less memory, restricted power consumption, smaller displays, and different and awkward input devices in comparison to what is available in a PC. Additionally, they have a limited screen size and the lack of a mouse or touch screen. This requires a different user interface (UI) metaphor, as compared with PCs. In some of these devices, there are touchscreens, but the small display sizes make the input and display of information difficult and cumbersome.

Two significant problems with PDAs and IAs are that they lack the full power of a PC and, from a price vs. performance perspective, the limited capabilities outweigh the benefits. Many PDAs are actually slave devices to PCs and the IAs lack the horsepower of a full-blown PC, such as a PC employing a PENTIUM® processor available from Intel Corporation. For this reason IAs are close enough in functionality to a PC that the price difference is not dramatic enough to warrant purchasing an IA. Similarly, PDAs are significantly less powerful than a PC such that, even with the relatively large price difference, in many cases purchase of a PDA is not justified.

A significant complaint about cellular telephones, PDAs and IAs is that they operate independently of one another. This has required the user to retain a plurality of devices if the user intends to provide the three functions, and obtain the advantages of the PDAs and the IAs. Some inventors have attempted to integrate the PDA and the cellular telephone, but these devices still lack the horsepower, display and input power of a PC. Some integration occurs between PDAs and PCs, because, as mentioned earlier, PDAs are inherently slave devices to a PC. However, such integration offers only limited advantages.

Because there will always be a performance gap between the very best desktop computers, PDAs, IAs and cellular telephones, a device is required that combines and consolidates these technologies in a meaningful device. This is the subject of the present invention.

Trademarks used herein belong to their respective owners and are used simply for exemplary purposes.

SUMMARY

The invention overcomes the identified limitations and provides a novel personal electronic device that combines the functionality of a cellular telephone, PDA, PC and IA. In an exemplary embodiment, a first (embedded) processor and a second (non-embedded) processor are combined in a handheld housing. The first processor performs a majority of the device's rudimentary functions and calls upon the second processor in order to perform more complex functions. The device is very power efficient since the first processor draws less power than the second processor. To further enhance power efficiency, the second processor is normally asleep and is selectively activated by the first processor to perform the complex functions to satisfy the user's operational demands. Programs and data for operating the second processor flow initially into the second processor. The second processor processes the programs and data and introduces the processed information to a read-only memory in the first processor. When the second processor is to perform such programs and utilize such data, the first processor introduces such program and data to the second processor for processing by the second processor.

The invention provides for one consummate handheld personal electronic device that performs a multiplicity of functions. Users will not need to learn a new operating system. There is no need for new, third party software development. All the applications that users are accustomed to running each day on their laptops or desktop computers can be utilized. The novel device is completely mobile, fitting into a shirt picket, a purse or the palm of one's hand. The device utilizes a single power source (e.g. one battery) for two processors, a first one an embedded processor that performs simple functions and a second one a non-embedded processor that performs relatively complicated functions and utilizes increased amounts of power. The second processor is normally inactivated and is activated when the first processor determines that the second processor should perform these functions.

In one embodiment, the embedded processor the embedded processor is configured to operate a keypad control program that includes a set of application protocols that enable the display using a keypad software application. In another embodiment, the invention includes a display switching circuit that enables the display to receive and accurately render information on the display from the respective processors. In another embodiment, the invention includes a display technology that is a novel size. In another embodiment, the invention includes a novel technique for controlling the temperature of the device and dissipating unwanted heat. In yet another embodiment, the invention includes a common application platform that establishes new protocols and interfaces between two operating systems. In various embodiments, the invention can also be configured as an appliance drive that communicates with another computer, for example, a standard type personal compter.

BRIEF DESCRIPTION OF THE DRAWINGS

The invention is described with reference to the drawings, in which.

DETAILED DESCRIPTION

Figure 1:
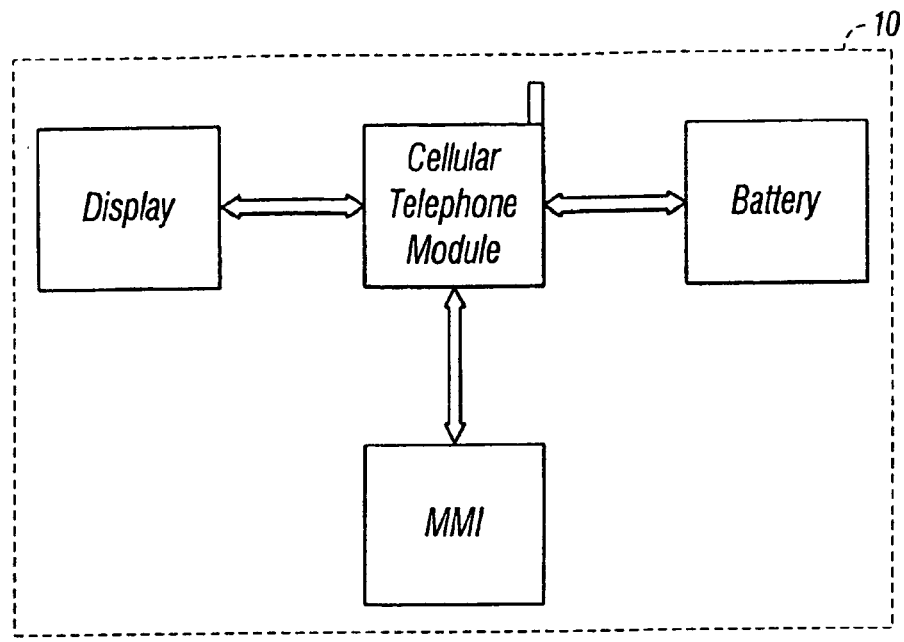
FIG. 1 is a block diagram of a typical prior art cellular telephone.
Figure 2B:
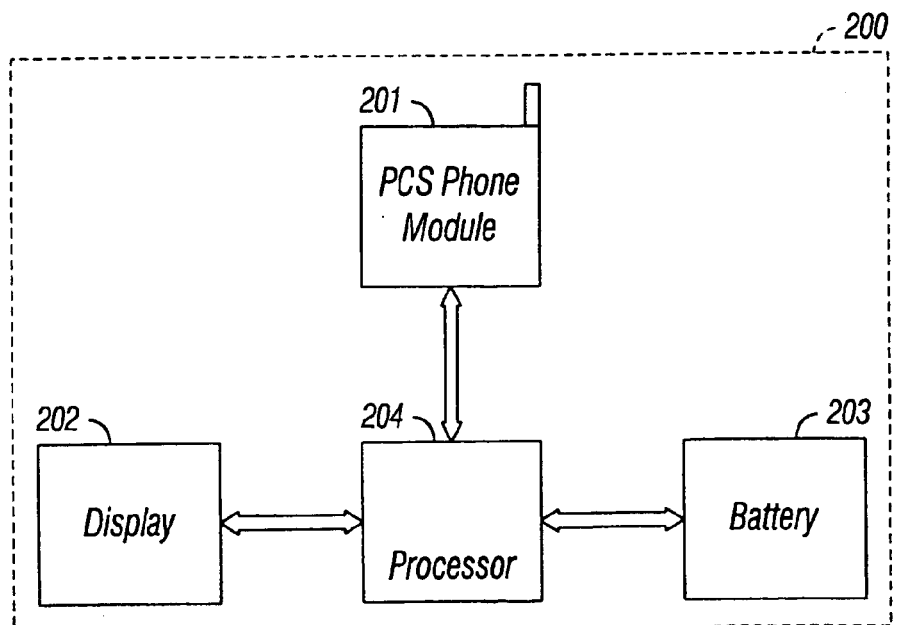
FIG. 2B is a block diagram depicting a prior art integrated cellular telephone and PDA.
Figure 2A:
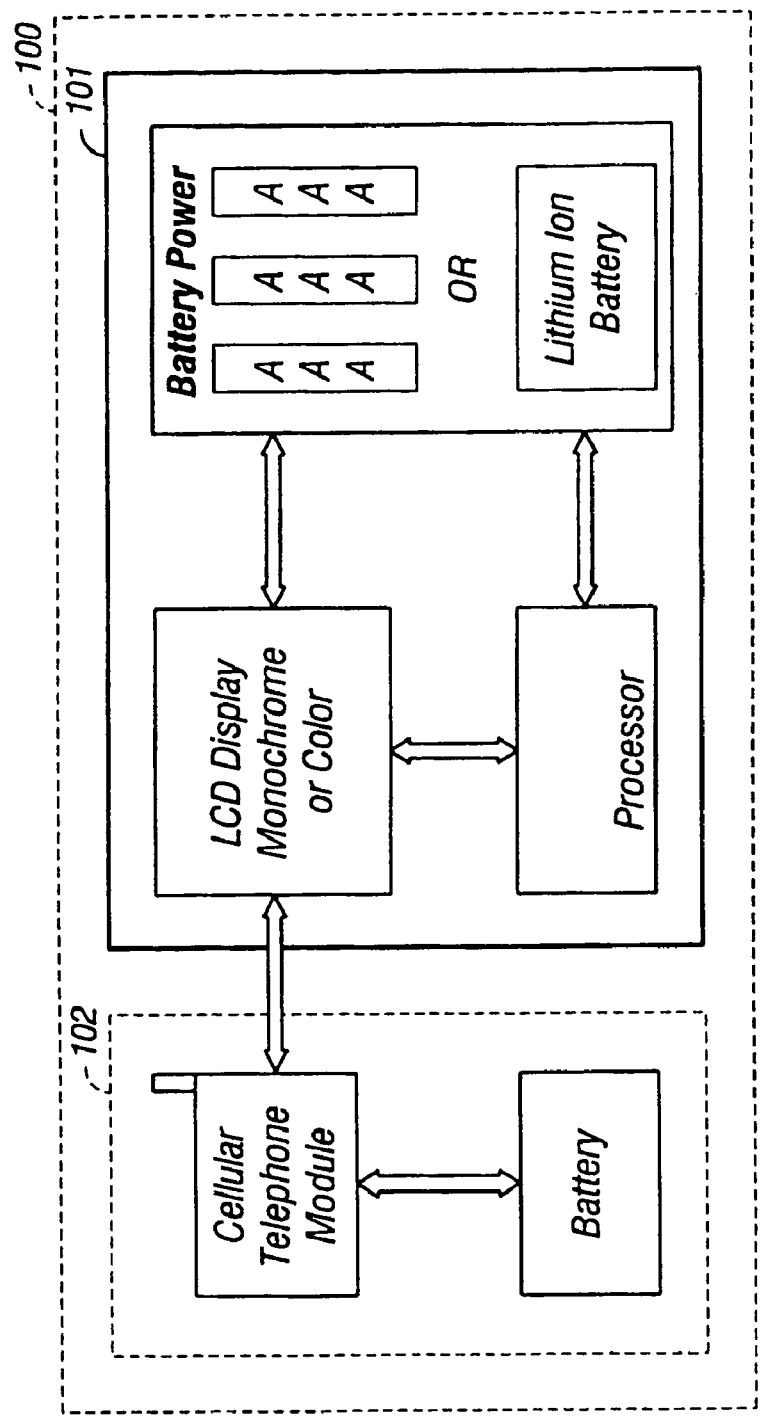
FIG. 2A is a block diagram of a prior art personal digital assistant (PDA) with a physically attached cellular telephone module.

The exemplary embodiments are described in detail to set forth the best mode of the invention. Those skilled in the art will recognize that modifications may be made while remaining within the spirit and claims of the invention below. For example, references are made to specific operating systems but any operating system satisfying the invention's requirements may be used. Likewise, references are made to specific integrated circuits and materials, but other integrated circuits and materials satisfying the invention's requirements may be used. Trademarks used herein belong to their respective owners and are used simply for exemplary purposes.

A. Device Architecture

In accordance with the teachings of the invention disclosed in application Ser. No. 09/809,963 a novel electronic device is taught that combines the features of a plurality of devices selected from: cellular telephone, PDA, PC, IA, pager, cordless telephone, remote control unit (for example, for use with television, stereo, entertainment devices, and so forth) and Global Positioning System (GPS) to provide one common easy-to-use universal device and user interface (UI).

In one embodiment of the invention, the novel electronic device is approximately the size of a cellular telephone and includes a large touch screen that provides a liquid crystal display (LCD) and that spans a significant portion of the length and width of the device. For example, the large touch screen may cover an area which would normally be used for both the display and the keypad on a cellular telephone. As one novel feature of this invention, the display and UI change to look appropriate for whatever application in use. For example, if the user desires to use the electronic device as a cellular telephone, the device provides on the LCD screen a cellular telephone image having a full size keypad.

1. Display

The UI is provided such that the cellular telephone image provided on the LCD will operate when the user touches appropriate locations on the touch screen LCD. This is interpreted by the cellular telephone application as a mouse click event. The same functionality can occur through the use of a jog dial by scrolling over the keypad number and, when highlighted, click the jog dial, by depressing the dial. This is interpreted by the cellular telephone as a mouse click event. The same functionality can occur through the use of a jog dial by depressing the dial. This is also interpreted by the cellular telephone as a mouse click. The same functionality can occur through the use of a jog dial by depressing the dial. This is also interpreted by the cellular telephone as a mouse click.

By using the touch screen, the user pushes the touch screen buttons just as if the user were pushing a keypad on a standard cellular telephone. By speaking into the microphone and through the use of the voice activated software, the user can speak the words "dial phone number" and then speak the telephone number. In one embodiment of this invention, the cellular telephone display and UI are selected from one of a plurality of cellular telephone display images and UIs, so that a user familiar with one brand or model of cellular telephone can have that image and UI to utilize with the device in accordance with the present invention. By touching an appropriate area on the LCD screen, or through the use of the job dial on the device, a user transforms the device into other useful software-driven formats, such as a PDA, TV remote control, and so forth.

The programmable touch screen design provides for several capabilities including that the screen can emulate cellular telephone manufactures makes and models through a cellular telephone keypad software application. In this manner, the users can feel comfortable with the interface since it may be similar to one that they already use. The user can enable the custom keypad editor software to create custom configurations, button size, color and so forth. The user can also select from a number of available skins and even create their own skins.

Figures 1, 3A:
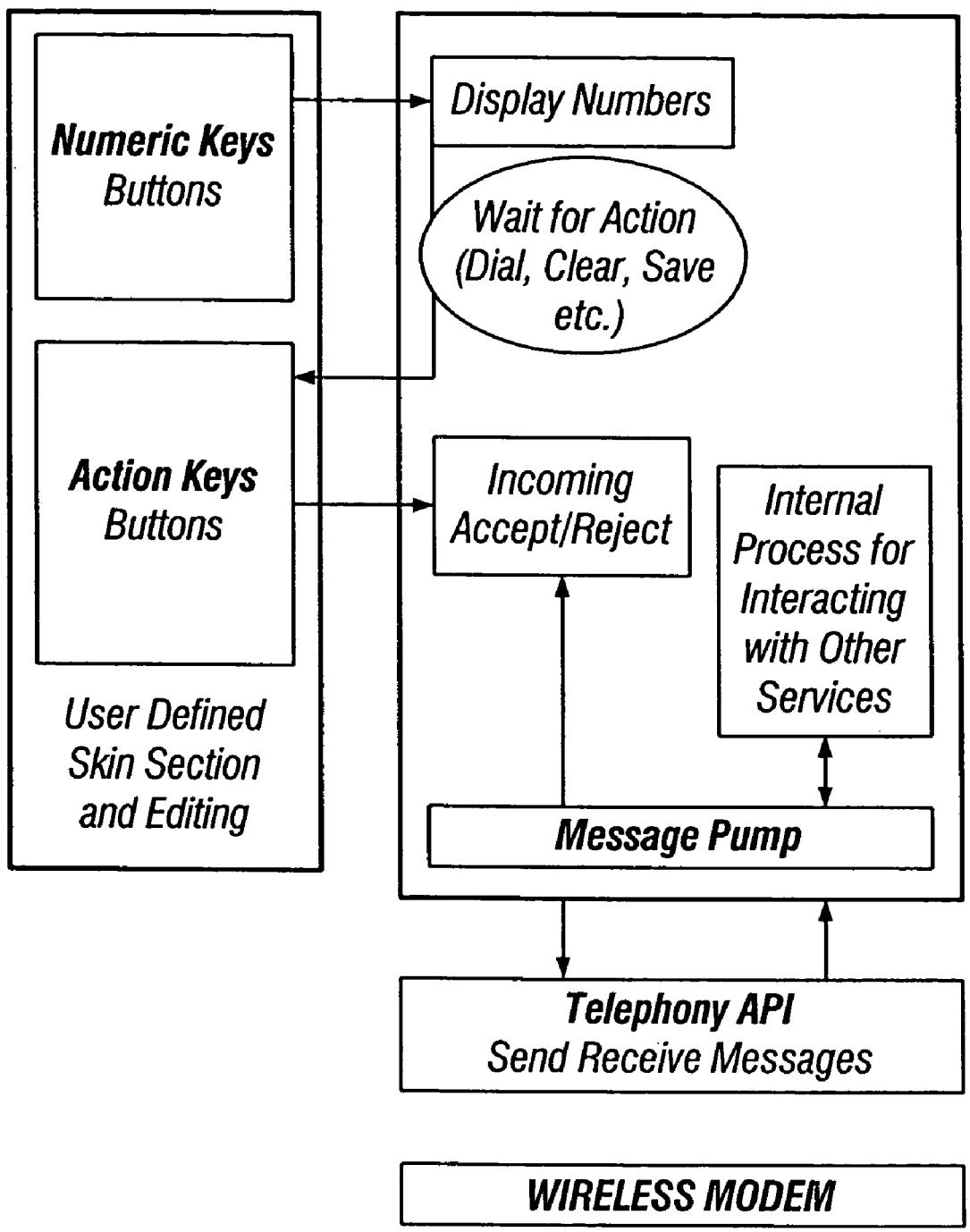
FIG. 3A is a bock diagram of the software architecture for a keypad application.
Figures 2, 3A:
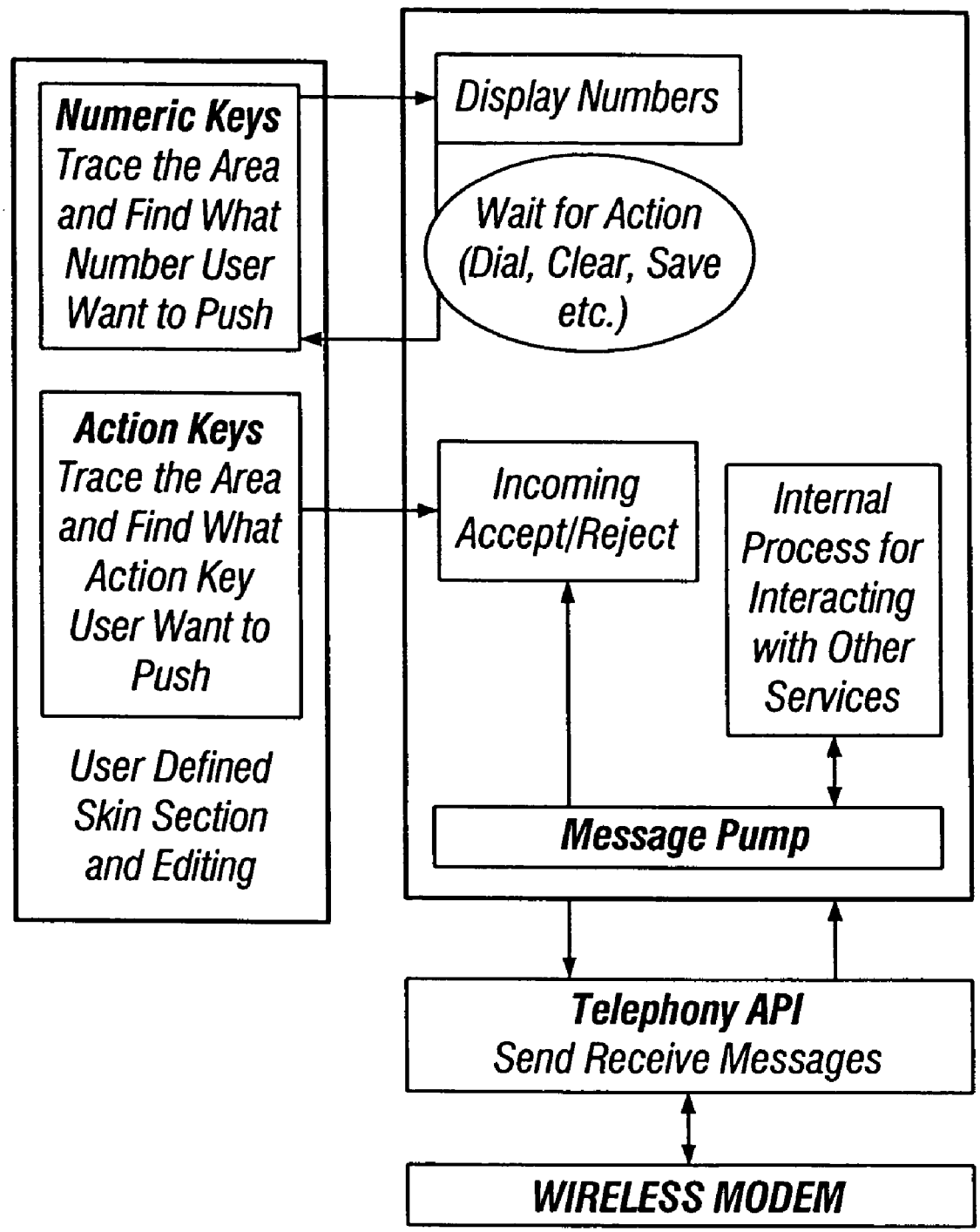

The architecture of the keypad application has three main components: (a) GUI; (b) internal logic and algorithm; and (c) telephony API. FIG. 3A depicts the high level architecture of the CE.net Keypad Application for both the MFC button-based and Graphical button-based versions.

The GUI section has two different implementations, the Microsoft Foundation Class (MFC) based buttons, and the Graphic-based buttons. In the MFC button-based version, the size of button and the shape of the button is constant, and is not user-definable. In the Graphical button-based version, the graphics are used and there are many design possibilities as it regards button size and shape. The skin selection and editing is common in both the MFC and graphical versions of the Keypad application. The user can select a different type of skin as well as select to paste the skin on the buttons themselves. The user can also paint the background area of the application any color of their choosing provided in the color palette. An advanced user can customize and edit the skin texture using a standard graphics editor.

2. Wired and Wireless Communications

In one embodiment, the novel electronic device of the present invention utilizes both wireless and PC hardware. In one such embodiment, the device uses three processors, for example, a phone module core processor available from Advanced Risc Machines, LTD of Cambridge United Kingdom under the tradename ARM 7, an embedded processor available from Intel Corporation under the tradename STRONGARM 1110, and a mobile processor available from Intel Corporation under the trademark PENTIUM® III. In one embodiment, the phone module is a Class B device, supporting both General Packet Radio Service (GPRS) and Global Special Mobile (GSM) to manage data, Short Messaging System (SMS), voice and fax transmissions. Dual band 900/1800 and 900/1900 support will ensure international access, without the need for separate modules. The PENTIUM® III mobile processor handles other office automation tasks, such as word processing and spreadsheet manipulation, as well as third-party software application, and land-line based Internet Protocol (IP) support, all managed by an operating system such as the operating system available from Microsoft Corporation under the trademark WINDOWS XP®.

3. Power Management

One embodiment of the invention disclosed in application Ser. No. 09/809,963 may be thought of, for the sake of simplicity, as a PC and a cellular telephone. These two devices have very different power requirements and user expectations for both stand-by time and use time. In addition to the normal individual power management functions for each of these two devices, the invention disclosed in application Ser. No. 09/809,963 includes an overall system level power management strategy and architecture. This power management strategy allows the device to operate as a cellular telephone independently from the computer in certain modes of operation.

In one embodiment of the invention disclosed in application Ser. No. 09/809,963, the computer processor is either turned off completely or put into a deep sleep mode any time that the more robust PC functionality is not absolutely needed. For example, when operating as a PDA, the embedded processor, memory and hard disk are used to the exclusion of the PC circuitry and phone module for such functions as contact management and scheduling, these functions having a lower power requirement. For browsing and email, the embedded processor, phone module, memory, and hard disk are utilized to the exclusion of the PC circuitry. When operating simply as a cellular telephone, the cellular telephone circuitry, having lower power requirements is utilized to the exclusion of the PC circuitry and hard disk. In addition, in one embodiment of the invention disclosed in application Ser. No. 09/809,963, when the battery charge level gets too low for computer usage, the power management mechanism shuts down the computer while still allowing enough talk time so that the cellular telephone can continue to operate.

Figures 1, 3B:
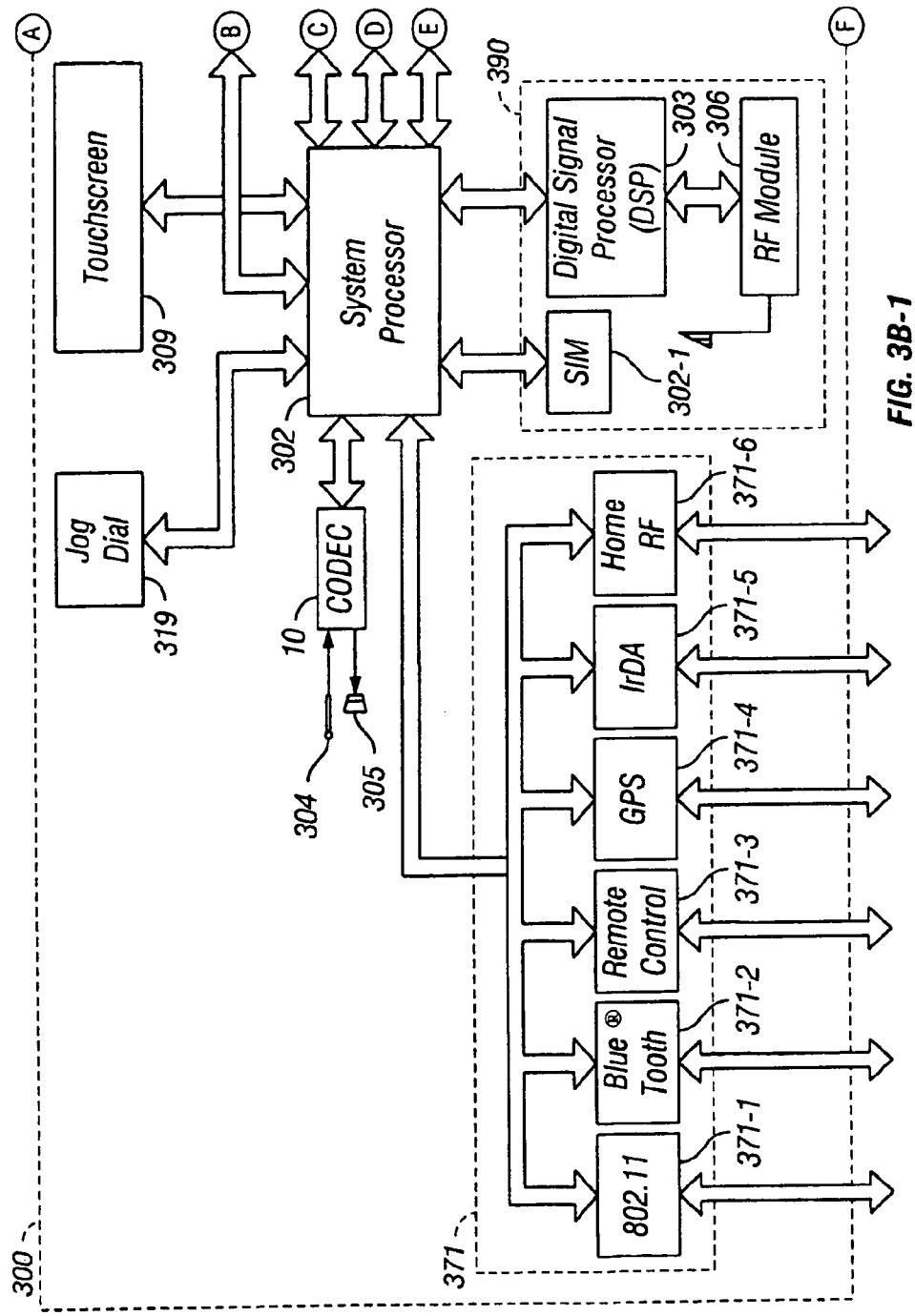
FIG. 3B is a block diagram of one embodiment of a novel personal electronic device of an invention.
Figures 2, 3B:
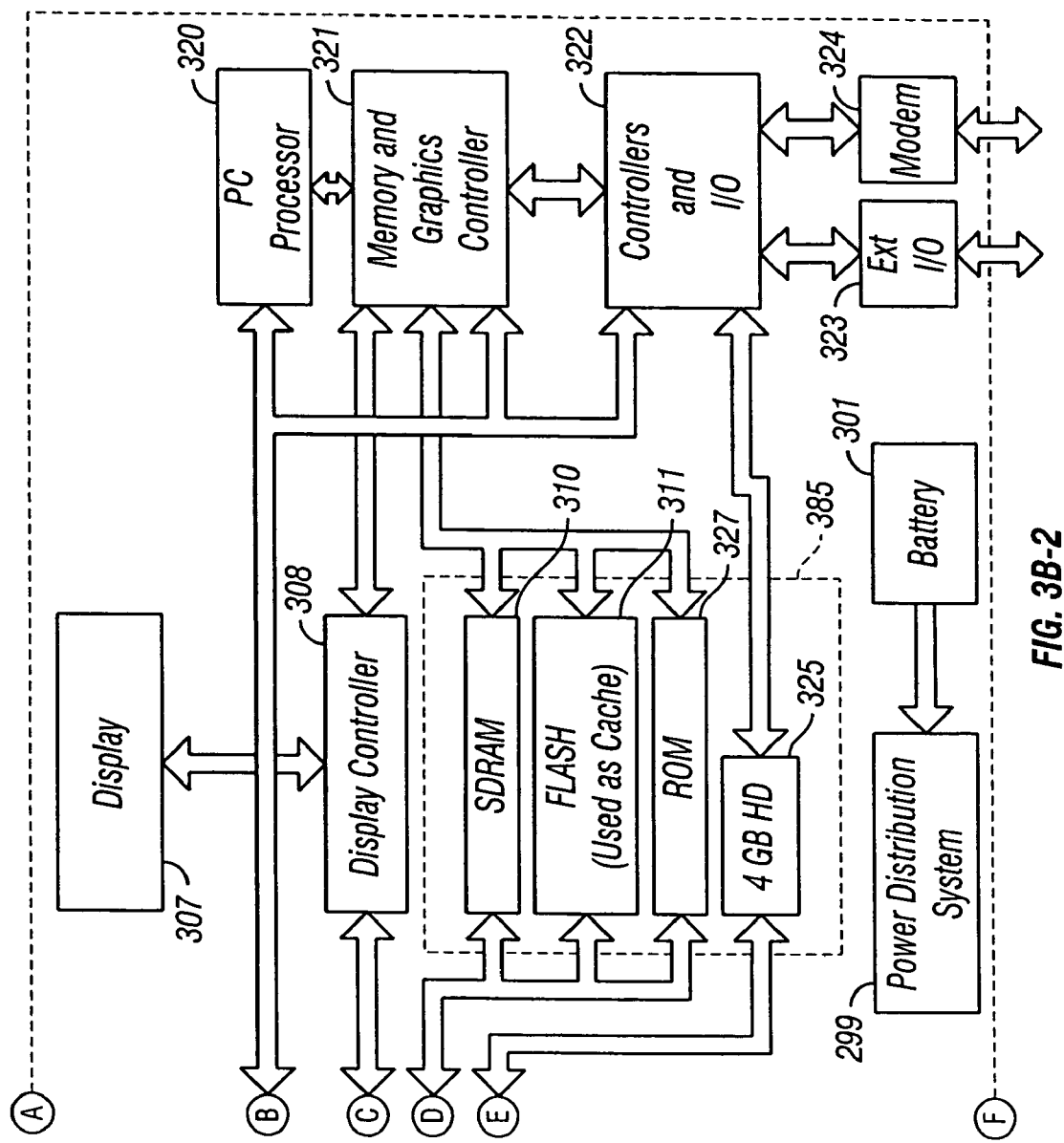
Figures 1, 3C:
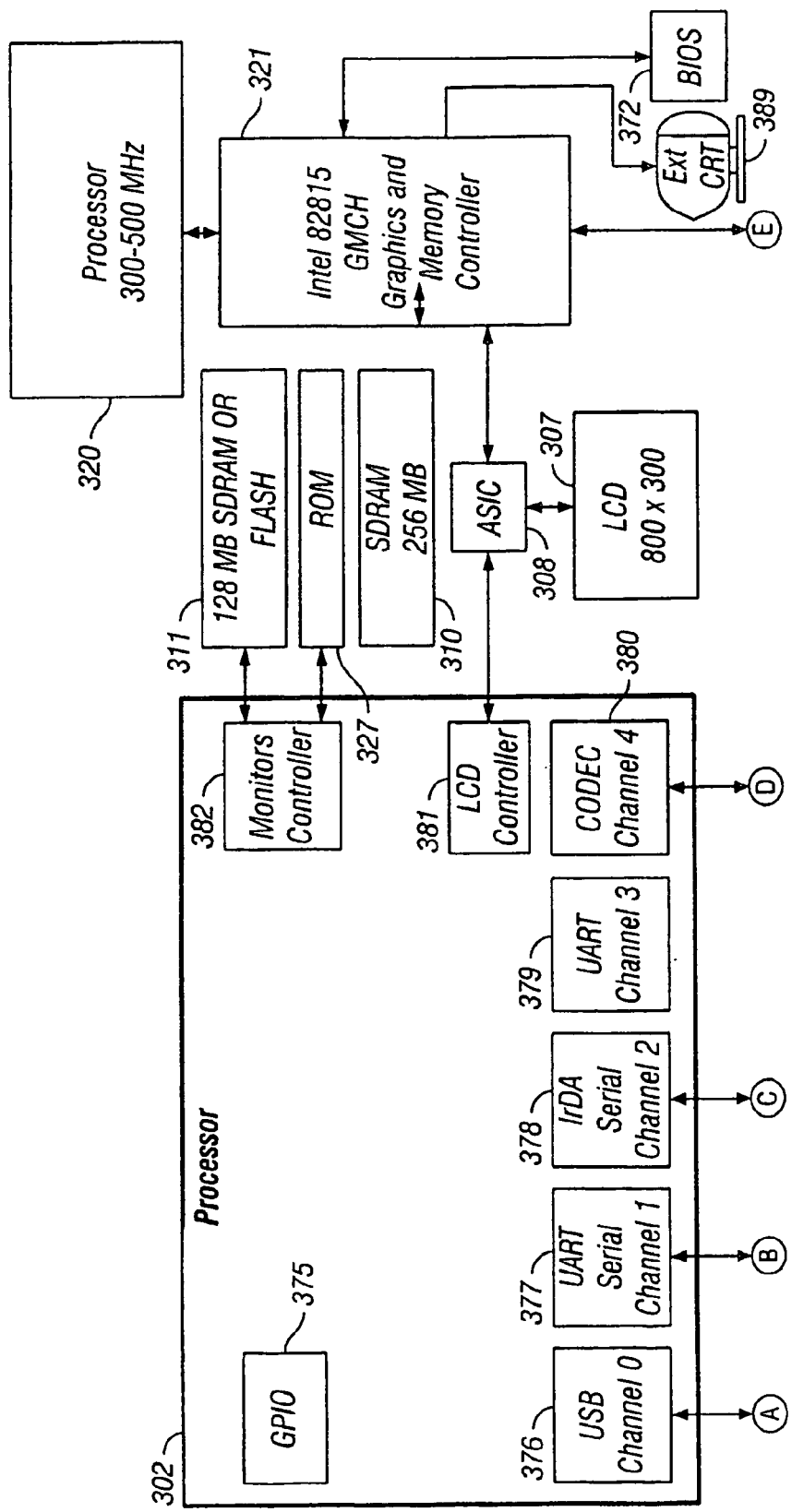
FIG. 3C is a detailed block diagram of one embodiment of a novel personal electronic device of an invention.
Figures 2, 3C:
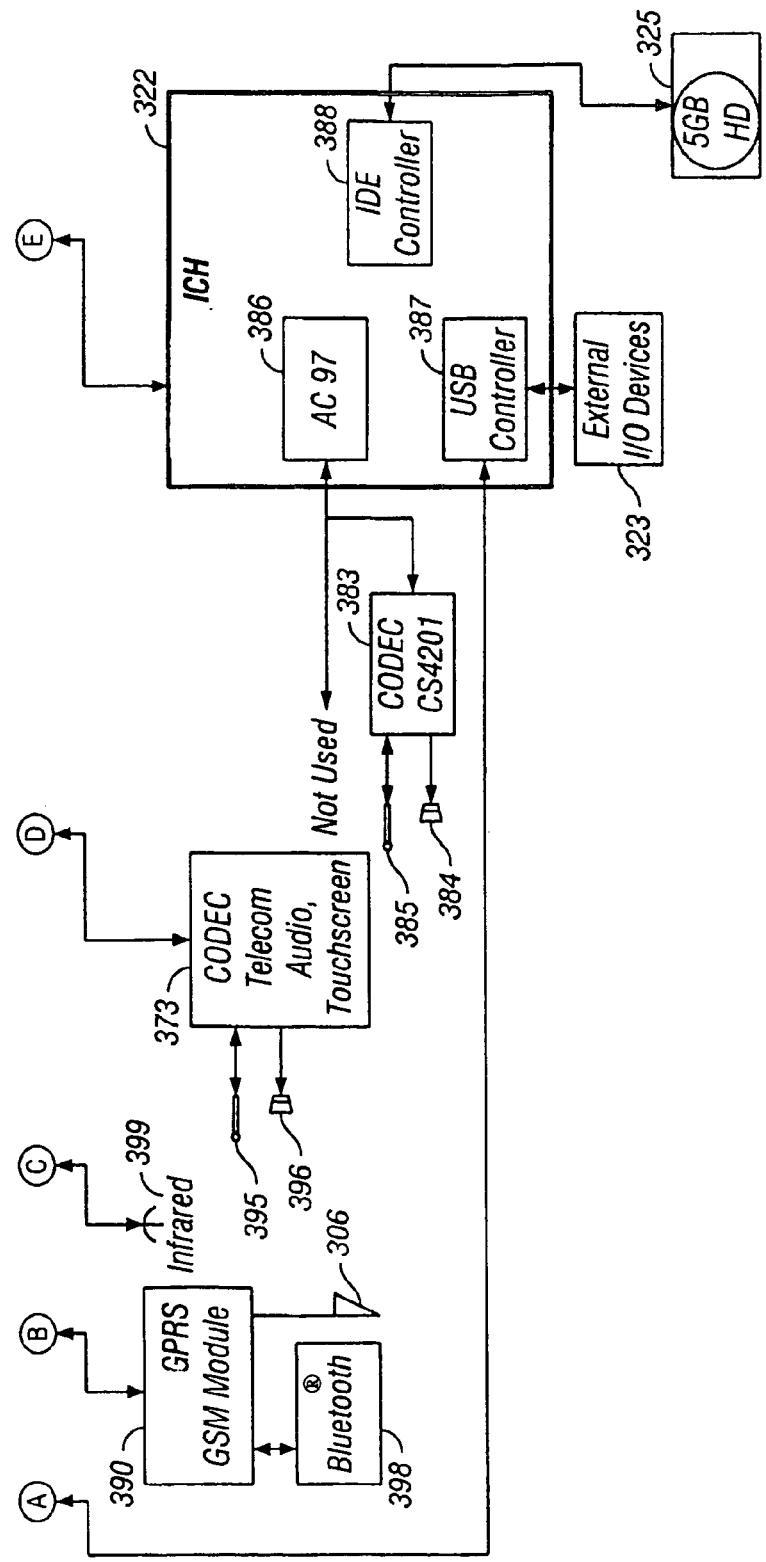

FIGS. 3B–C are block diagrams of embodiments of the invention, where FIG. 3B was previously disclosed in application Ser. No. 09/809,963. In this embodiment, a device 300 may include a single battery 301, which serves to apply power to all of the modules contained within device 300. This power is applied via power distribution system 299. System 209 is of a type well known to those of ordinary skill in the art and will not be discussed in further detail in this application. In one embodiment, battery 301 may be a lithium polymer battery, for example of 3.5 to 6.0 ampere hour capacity, such as is available from Valence Corporation.

Device 300 includes a system processor 302, which in one embodiment has lower power requirements, and is capable of performing more limited functions, than a standard computer processor. In one embodiment in the system disclosed in application Ser. No. 09/809,963, in order to achieve this lower power requirement, system processor 302 is an embedded processor, having a simplified and embedded operating system contained within its on-chip memory. One such embedded processor suitable for use as the system processor 302 is the STRONGARM 1110. Processor 302 serves as a system controller for the entire electronic device 300.

4. System Processor

System processor 302 includes a number of components as is more fully described, for example, in the Technical White Paper that describes the parameters of the STRONGARM 1110, such that system processor 302 is capable of handling contact management, scheduling, and email tasks, as is known in the art, for example in the pocket personal computer available from Hewlett-Packard Company (HP) under the tradename JOMADA POCKET PC. In this exemplary embodiment, system processor 302 controls telephone module 390, which serves to provide cellular telephone communications by utilizing any one or more communications standards, including CDMA, TDMA, GSM and the like. Telephone module 390 includes signature identification module SIM 302-1, digital signal processor (DSP) 303, and RF module 306.

DSP 303 receives audio input via microphone 304 and provides audio output via speaker 305. The operation of telephone module 390 is well known in the art and will not be further discussed in detail in this application. In one embodiment, SIM 302-1 is a unique identification encrypted device available from Xircon Company, with DSP 303 being the digital signal processor (DSP) device, and RF module 306 being the radio frequency (RF) device. These components can be purchased, integrated into a GSM module from Xircom Corporation under the tradename CREDITCARD GPRS. In one embodiment, SIM 302-1 is interchangeable so that a user's phone number does not have to be changed when migrating to device 300 from a standard cellular telephone.

Device 300 also includes processor 320, which performs tasks requiring greater processor power than is available in system processor 302. For example, in one embodiment processor 320 can access typical computer programs, such as those available from Microsoft Corporation under the trademark WINDOWS ME® and programs running under WINDOWS ME®, such as those sold under the tradename WORD and those sold under the trademarks EXCEL®, POWERPOINT®, and the like. In one embodiment, computer processor 320 is available from Transmeta Corporation under the CRUSOE® processor operating at 500 megahertz. In an alternative embodiment processor 320 is a PENTIUM® III mobile processor operating at 300 to 500 megahertz.

Processor 320 is not used for simpler tasks, which are handled more effectively by system processor 302, particularly with respect to power consumption in system processor 302 and without the need of system processor 320 to be awakened from sleep. Through the use of dual processors 302 and 320, and thus dual operating systems, the invention disclosed in application Ser. No. 09/809,963 overcomes the inability to reliably "wake up" from a memory based "sleep mode." By using the embedded operating system of processor 302 and associated embedded software applications for the highly used "simple applications," processor 320 is not frequently required to wake up. Processor 320 is "awakened" only to perform non-simplistic applications and is "awakened" by signals from the hard disk in the processor 302 rather than by signals from a volatile memory in the processor 320.

Such tasks which are, in certain embodiments, performed by system processor 302 rather than computer processor 320 include the control of telephone module 390, the control of display 307, interfacing with touch screen 309 jog dial module 319 and display controller 308, as well as interfacing with memory devices 310 and 311, during operation of telephone module 390. In certain embodiments, system processor 302 also performs additional features suited to its relatively low level of computational ability and low power requirements, such as interfacing with hardware elements contained within accessories module 371. Such operations include, for example infrared remote control operations using IR module 371-3, for example, for use with entertainment devices.

5. Wireless Components

In one embodiment, remote control module 371-3 interfaces with system processor 302 is a universal remote control device available from Sony Corporation. In such embodiments system processor 302 also performs features associated with accessory module 371-1 which, in one embodiment, is a wireless LAN mobile 802.11 device available from 3Com Corporation and, in other embodiments ,operation of module 371-2 that is compatible with short range communication protocols, such as BLUETOOTH®, for example, for cordless headset, and cordless telephone and operation with a cordless telephone base station connected to a landline and communicating with device 300 via the short range communication protocol.

In one embodiment, module 371-2 interfacing with system processor 302 is a wireless device available from Philips Corporation. Such other functions which system processor 302 performs via the accessory module 371 include operation of GPS module 371-4, in order to provide detailed and accurate positioning, location, and movement information and the like as well known to those familiar with GPS systems. In one embodiment, GPS module 371-4 is a compact flash card device available from Premier Electronics. The built-in GPS can be utilized to determine the latitude and longitude of device 300. This information can be supplied to software applications such as those which provide driving instructions and eCommerce applications that associate consumers and merchants via latitude and longitude for online ordering, such as the application service provider (ASP) food.com.

In one embodiment, accessory module 371 interfacing with system processor 302 includes IRDA module 371-5, which is used for point to point wireless IR communications, which in one embodiment is an integrated transceiver device available from Novalog Corporation. In one embodiment, accessory module 371 includes home RF module 371-6, which serves to provide access to a pre-existing 2.4 GHz home wireless communication network, and which, in one embodiment, is a 2.4 GHz wireless device available from WaveCom Corporation. In one embodiment the short range communication protocol and PC synchronize functions between system 300 and other PC computing devices that have utilized the BLUETOOTH® technology as their wireless interfaces.

In certain embodiments, system processor 302 also performs more sophisticated tasks, yet tasks which are well suited to its level of computational ability, which is less than that of processor 320. Such tasks include, for example, WINDOWS CE®, and programs which may be run under WINDOWS CE®, for example running display 307 during the telephone mode, and the pocket version of OUTLOOK® available from Microsoft Corporation, including email, contact management, and scheduling.

6. Shared Components

In the embodiment shown in FIG. 3B, memory and storage module 385 serves as a shared resource module which may be shared by system processor 302 and processor 320. The processor 320 may access memory and storage module 385 via memory and graphics controller 321. Memory and storage module 385 may include, in this exemplary embodiment, ROM 327 which may serve to store the embedded operating system. In one embodiment, WINDOWS CE®, SDRAM 310 may serve as the main memory for devices 302 and 320 for use by computer programs running on their respective operating systems. In this embodiment, flash memory 311 may be used as an application cache memory. In this embodiment, hard disk drive 325 may be a 4 gigabyte micro-drive such as is available from IBM Corporation. In an alternative embodiment, hard disk drive 325 may be a semiconductor device which emulates a hard disk, such as is available from Sandisk Corporation. In one embodiment, SDRAM 310 may provide 64 to 256 megabytes of FLASH memory, such as is available from Samsung Corporation. In one embodiment, the available memory may be shared but specific memory addresses are not shared. Memory address blocks are not shared or made available to both system processor 302 and computer processor 320 at the same time.

Utilizing hard disk drive 325 as a shared resource between system processor 302 and processor 320 provides an enormous data storage capacity available for both processors and eliminates the data storage limitation normally encountered when using a typical prior art PDA or a similar device utilizing an embedded processor with a limited amount of semiconductor memory. In one embodiment, hard disk drive 325 may be artificially partitioned for data storage space compatible with the operating system WINDOWS CE. In another embodiment, hard disk drive 325 may, share the file systems between the two operating environments by protecting certain operating environment files but still allowing for the use of shared files when appropriate.

7. Graphics and Display

Operating with processor 320 are memory and graphics controller 321, such as a graphics memory controller hub (GMCH) device available from Intel Corporation available under the tradename 82815, and controller and I/O module 322, such as a integrated controller hub (ICH) device available for example from Intel Corporation under the tradename 82801. This device provides IDE and PCI controller types of functions, as well as a USB output port suitable for use such as connecting to the 601 module as a docking strip or connecting to module 700 as an appliance unit to an existing PC. In an alternative embodiment, controller and I/O module 322 is an ICH device available from Intel Corporation under the tradename 82801 operating in conjunction with another device such as one available from Intel Corporation under the tradename WA3627, which provides additional peripheral device attachments such as floppy drives, additional hard disks, CD-ROMS, DVD's, external mouse, keyboards and external monitor integrated in a combination as to form as to comprise module 800 as the docking station functionality. Controller and I/O module 322 serve to interface processor 320 with various 1/0 devices such as hard disk drive 325. Other I/O modules include modem 324, and other external I/O devices controlled by external I/O controller 323. Such other external I/O devices include, for example, keyboard, CD ROM drive, floppy disk drives, mouse, network connection, and so forth.

In one embodiment of the invention disclosed in application Ser. No. 09/809,963, system processor 302 serves as the overall power manager of device 300. Thus, system processor 302 determines when processor 320 will be on and when it will be in its sleep mode. In one embodiment, system processor 302 determines the operating speed of processor 320, for example, based on the tasks being performed by processor 320, the charge on battery 301, and user preferences.

8. Power Management

As part of its power management tasks, system processor 302 determines which components related to processor 320 will be turned on when processor 320 is in operation. Thus, processor 320 can be operating while one or more of external I/O controller 323, modem 324, and hard disk drive 325 are disabled because those devices are not necessary for the tasks at hand, thus saving power and extending the useful life of Battery 301. As part of the power management operation, system processor 302 also determines when display 307 is illuminated, when telephone module 390 is powered up, and the like.

Many of the power management decisions are driven by the user's desire to perform a specific function. For example, in one embodiment, to access a computer program such as a program available from Microsoft Corporation under the trademark OUTLOOK® the following events occur to minimize power requirements, system processor 302 powers up only processor 320 and memory and graphics controller 321. In this manner, FLASH memory 311 and SDRAM 310 are accessed via memory and graphics controller 321. Memory and graphics controller 321 manages the graphics display of OUTLOOK®, and the OUTLOOK® executable and data file are read from FLASH memory 311 and/or SDRAM memory 310. If the user alters the OUTLOOK® data file in FLASH memory 311 and/or SDRAM memory 310, such as by adding a new contact, then system processor 302 in conjunction with memory and graphics controller 321 writes the updated information back to FLASH memory 311 and/or SDRAM memory 310. When the user exits OUTLOOK®, system processor 302 writes all necessary data back to FLASH memory 311 including any data elements residing in SDRAM memory 310.

The following chain of events will then occur:

a. System processor 302 attempts to wake up processor 320.

b. If processor 320 cannot be awakened due to undesirable conditions determined by system processor 302 and PC elements 320, 321, 322, 323, and 325 (which are now powered up).

b.1. A re-boot of processor 320 is initiated.

b.2. The PC module reboots Window 320 ME in the background. Once the reboot has been completed, then the updated OUTLOOK® data residing in FLASH memory 311 is written to hard disk version of the data file in OUTLOOK®.

b.3. Once the reboot has been completed, then system processor 302 returns processor 320 to sleep mode.

c. On the contrary, if the PC module can be awakened, the updated OUTLOOK® data residing in FLASH memory 311 is written back to the OUTLOOK® data file residing on hard disk drive 325.

d. System processor 302 returns processor 320 to sleep mode.

As another feature of power management, system processor 302 manages the duty cycle of display 307. For example, user input to the touch screen results in display 307 power up. The user then taps the cell phone icon on the main menu and the keypad application is invoked by loading from FLASH memory 311. The user taps in a phone number to call and taps the "Send" button. The application dials the phone number stating "Dialing Number . . ." and connects the call displaying "Call Connected." The application messages to system processor 302 that the call has been completed and transaction complete. System processor 302 waits for a period of time, for example 3 seconds, then powers down display 307 to conserve power. System processor 302 then is in its "standby" mode, idling and waiting for user input or an incoming call to "wake up."

9. Simultaneous Operation of the Processors

As described above, the non-embedded processor is configured to perform a set of functions and the embedded processor is configured to perform a limited set of functions compared to the non-embedded processor. In one aspect of the invention, the embedded processor and non-embedded processor are configured to selectively operate simultaneously. This is advantageous because each process may perform different functions for the user, and the user can access both functions simultaneously. Simultaneous operation is typically triggered by the user providing an instruction to operate the embedded processor and non-embedded processor functions.

In some cases, the embedded processor functions include functions not supported by the non-embedded processor, and the non-embedded processor functions include functions non supported by the embedded processor and the embedded processor and the non-embedded processor are configured to operate simultaneously when exclusive functions of both the embedded processor and non-embedded processor are to be performed.

B. Display Design and Controller

1. LCD Design

System processor 302 also serves to control display 307, which may have any suitable display technology, for example LCD. In one embodiment, display 307 is a LCD Thin Film Transfer (TFT) Reflective Touch screen Reflective, front-lit display, such as manufactured by Sony Corporation and used in the device available from Compaq Computer Corporation under the tradename IPAQ 3650. In one embodiment, display 307 has a resolution of 150 dpi with 65,836 colors available, and is a half SVGA 800×300 dpi. In one embodiment, an aspect ratio 800×600 is provided but only a fraction of the height (for example only the upper half or lower half) of the actual image is displayed, with jog dial or touch screen control used to scroll to the upper or lower half of the screen not in view. Display 307 is controlled by display controller 308, which serves to receive display information from system processor 302, and from processor 320, via memory and graphics controller 321.

System processor 302 instructs display controller 308 as to which display signal source is to be used, i.e., that from System Processor 302 or that from memory and graphics controller 321. System processor 302 also controls touch screen 309 and jog dial module 319. Touch screen 309 serves as a user input device overlaying display 307, and is, for example, an integral part of the device from Sony Corporation. Jog dial module 319 receives user input applied to the touch screen and converts these analog signals to digital signals for use by system processor 302.

2. Display Switching

Device 300 runs with two display controllers driven by two different processor technologies. One display controller is called an "LCD Controller" and is an embedded controller within the STRONGARM processor. The other is a PENTIUM® III processor and is driven by its ancillary 82815 Graphics Memory and Controller Hub (GMCH) chip. The fundamental problem is that the LCD accepts 18 bits of display data, but the LCD Controller on the STRONGARM outputs 16 bits of display data, and the PENTIUM® III 82815 GMCH outputs 24 bits of display data. The purpose of the ASIC is to translate the differences between the two display controllers and represent the display data in 18 bits to the LCD regardless of which controller is used.

Figure 4A:
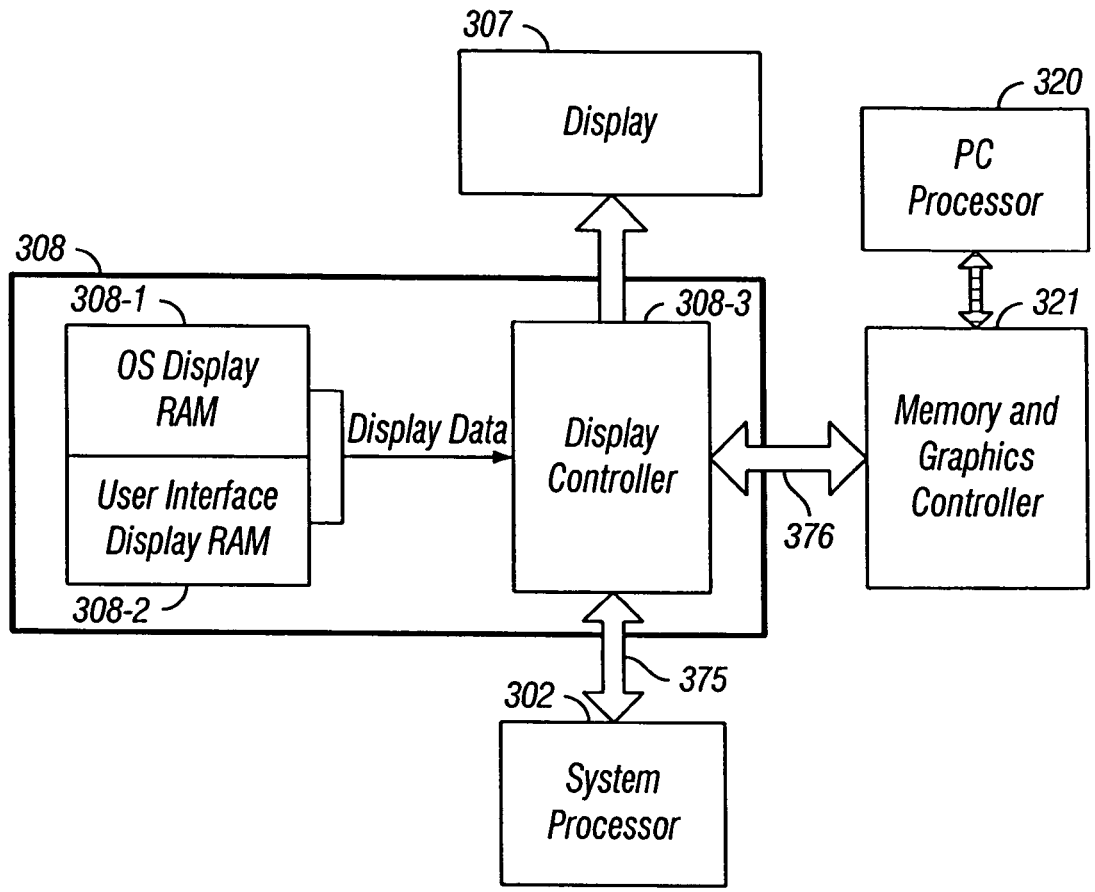
FIG. 4A depicts a detailed diagram of one embodiment of a display controller of FIG. 3B.

FIG. 4A is a block diagram depicting in more detail display controller 308. Shown for convenience in FIG. 4A is also system processor 302, memory and graphics controller 321, and display 307. In one embodiment, display controller 308 includes memory, which includes two portions, WINDOWS® DISPLAY ram 308-1 and user interface display RAM 308-2. Memory 308-1 and 308-2 is, in one embodiment, a dual ported RAM allowing communication with both system processor 302 and memory and graphics controller 321. In an alternative embodiment, memory 308 is not dual ported, but rather is divided into two portions of high speed synchronous RAM, with system processor 302 and processor 320 being allocated their own separate portions of RAM 308.

WINDOWS® display memory 308-1 receives from both system processor 302 and processor 320, as appropriate, the frame data, which forms part of the definition of the image to be displayed on LCD 307. User interface display RAM 308-2 receives from system processor 302 and processor 320, as appropriate, pixel data for use with the frame data stored in the WINDOWS® display RAM 308-1, which will complete the information needed to provide the desired display on display 307. Display controller 308-3 serves to retrieve data from WINDOWS® display data RAM 308-1 and user interface display RAM 308-2 to provide the desired display on display 307. Display controller 308-3 communicates with system processor 302 via control bus 375 and also communicates with memory and graphics controller via control bus 376.

Figure 4B:
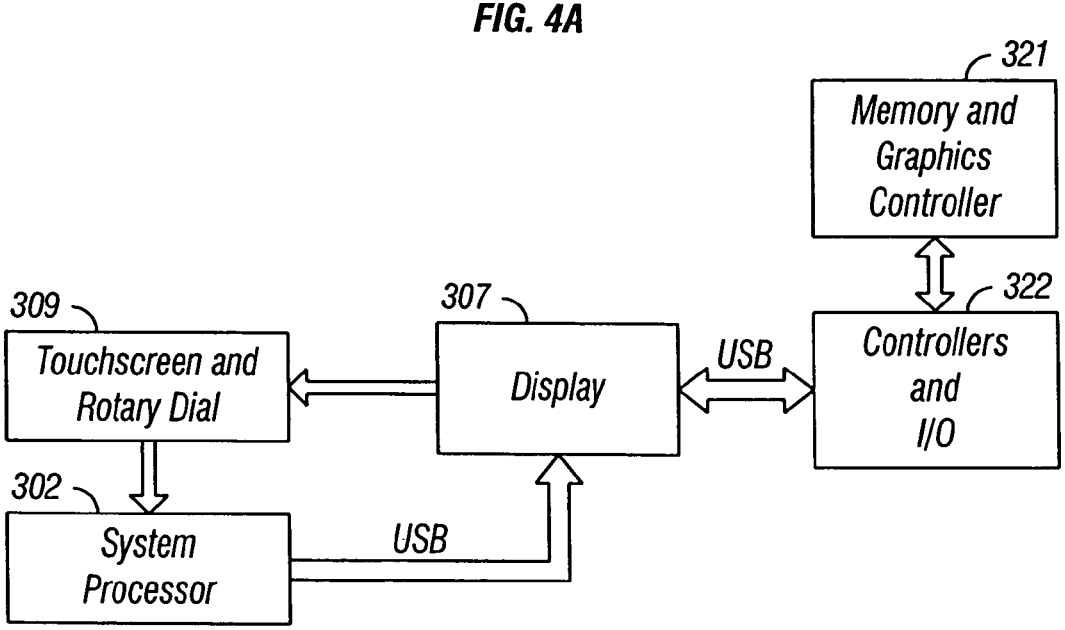
FIG. 4B depicts an alternative embodiment of a display of FIG. 4A.
Figure 4C:
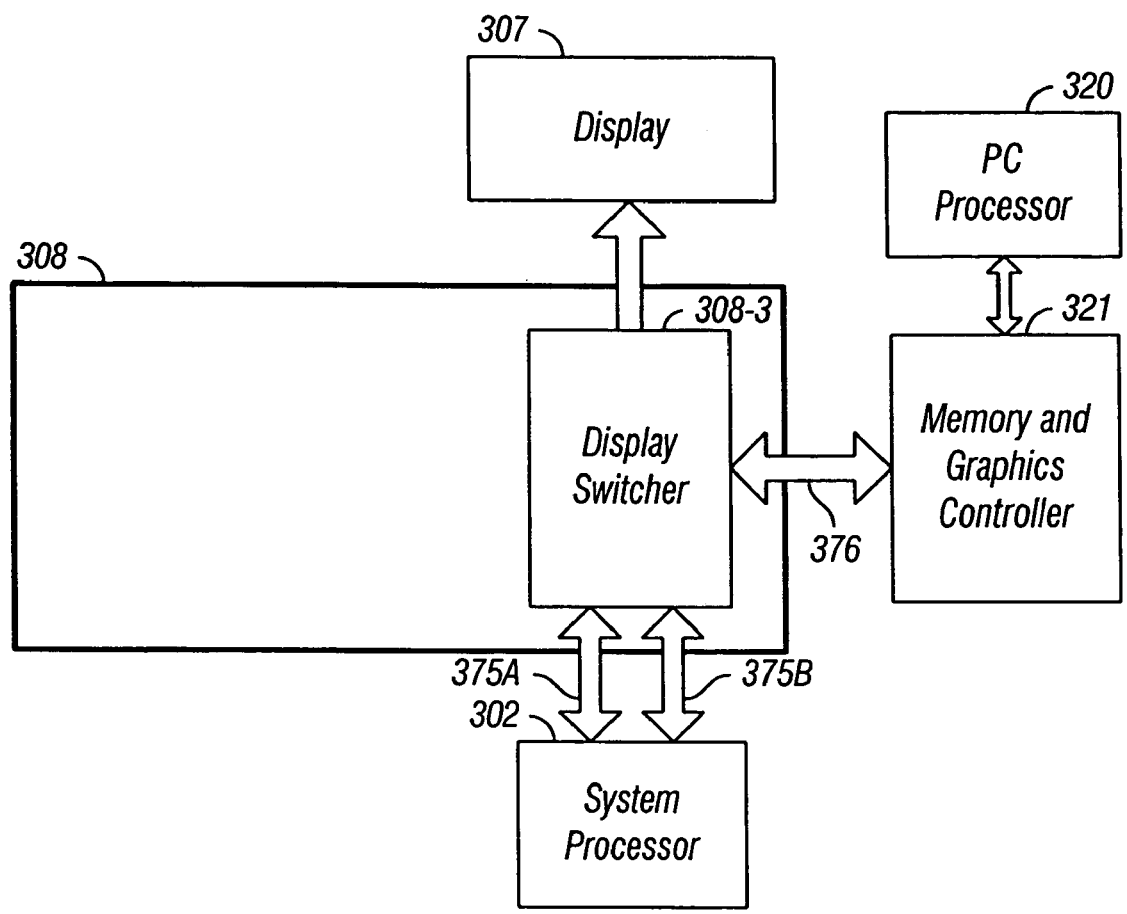
FIG. 4C depicts an alternative embodiment of a display switch shown in FIG. 4A.

FIG. 4B is an alternative embodiment in which system processor 302 and memory controller 321 communicate with display 307 by utilizing separate display controllers contained within system processor 302 and memory controller 321, respectively. In this embodiment, display controller 401 is provided, which includes a selection circuit operating under the control of system processor 302 for selecting video display signals received from the display controller contained in system processor 302 or, alternatively, signals from the display controller contained in controllers and 110 module 322, under the control of memory and graphics controller 321. For example, when system processor 302 is an embedded STRONGARM 110 processor, it contains its own display controller with USB input/output (I/O).

Similarly, graphics and memory display controller 321, which in one embodiment is the 82815 GMCH device, communicates with I/O module 322, which in one embodiment is the 82801 ICH device having its own USB output as well. In this embodiment, universal serial bus (USB) connections provide communications between system processor 302 and display 307, and between controllers and U0 module322 and display 307. In this embodiment, the processing of display data occurs within controllers residing in devices 302 and 321. In this embodiment, display controller 401 acts as a switching device, not a processing device, between the two controllers described above.

Example A: In one example, shown in FIG. 4D, the default display is a touchscreen 800×300 TFT LCD 307, and is driven by the STRONGARM processor 302 LCD controller 381. The STRONGARM processor 302 and an embedded operating system available from Microsoft Corporation under the tradename CE.NET is used for running the LCD touchscreen driver, as well as the main menu, web browsing, e-mail and the cell phone keypad applications.

Figure 4D:
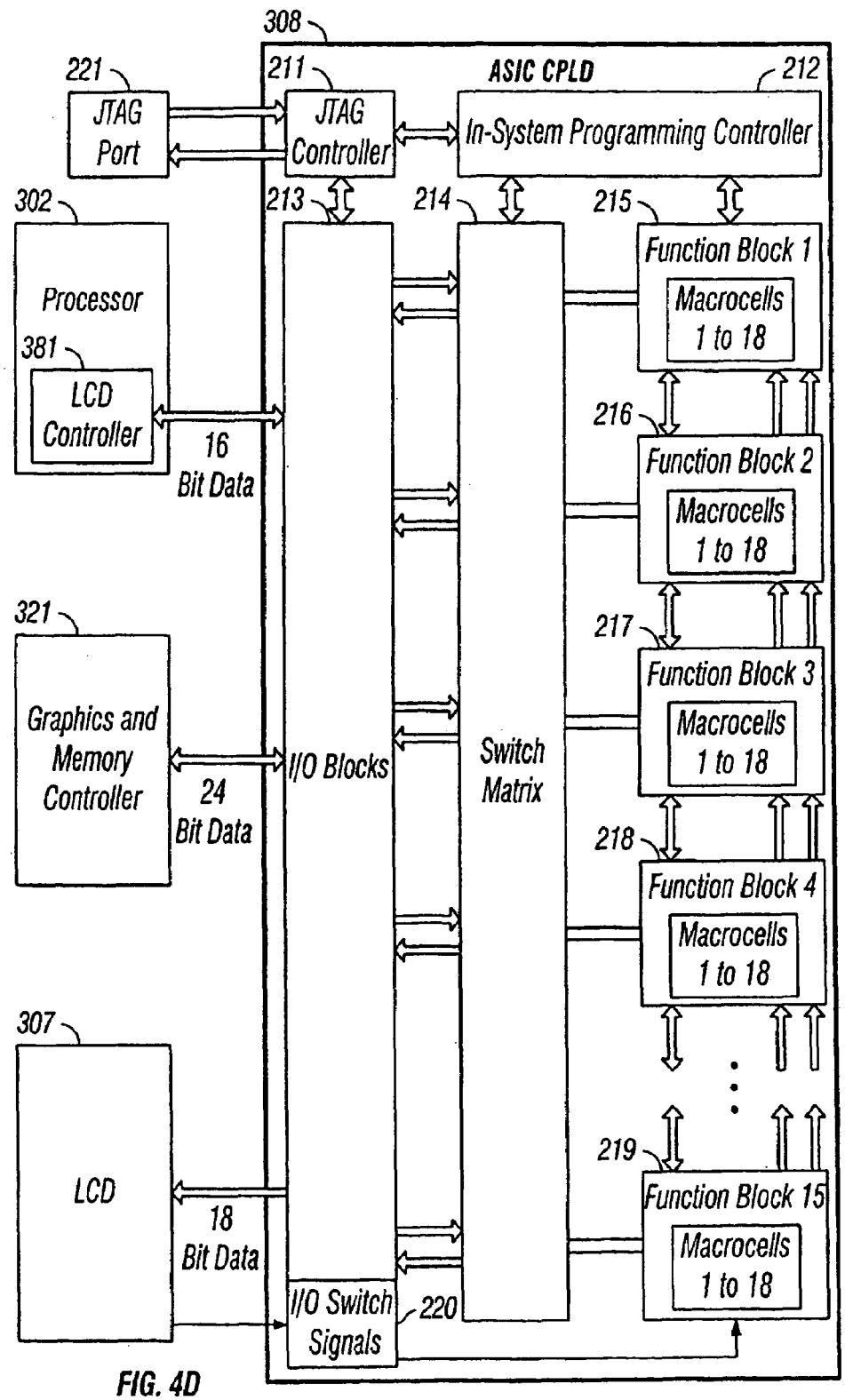
FIG. 4D depicts a Complex Logic Device (ASIC) and the logical flow of data to make a switch between an embedded and non-embedded LCD controller.
Figure 4E:
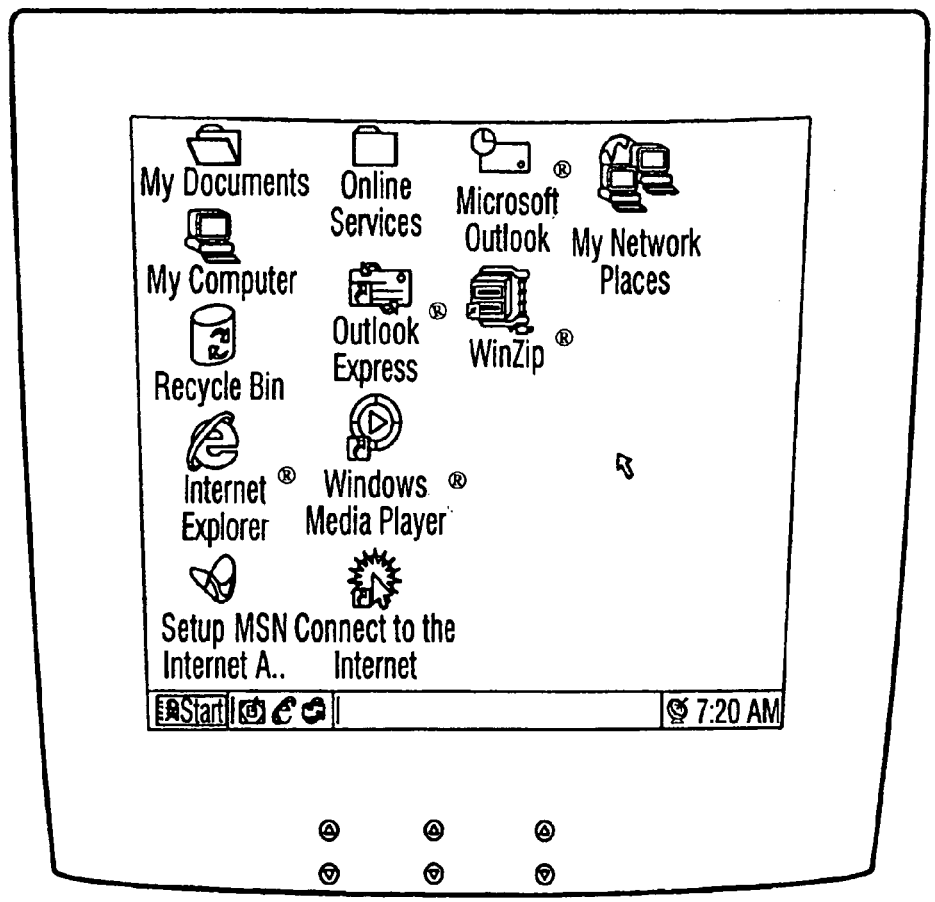
FIGS. 4E–G depict screen shots of a display according to an embodiment of the invention.
Figure 4F:
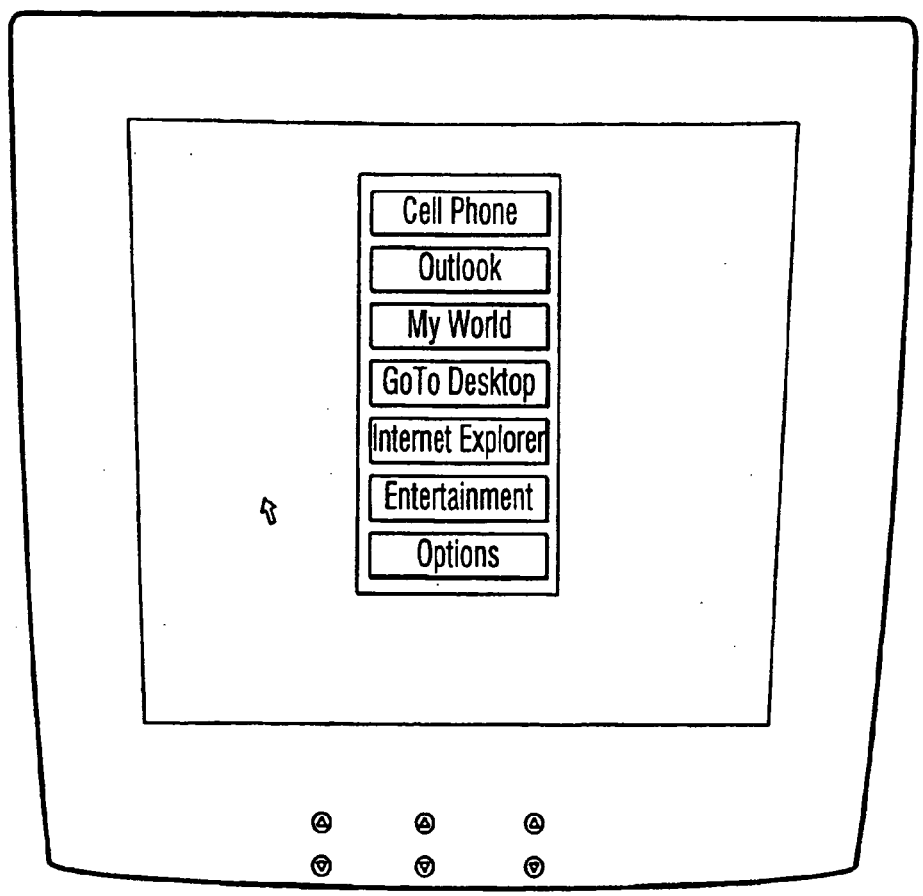
Figure 4G:
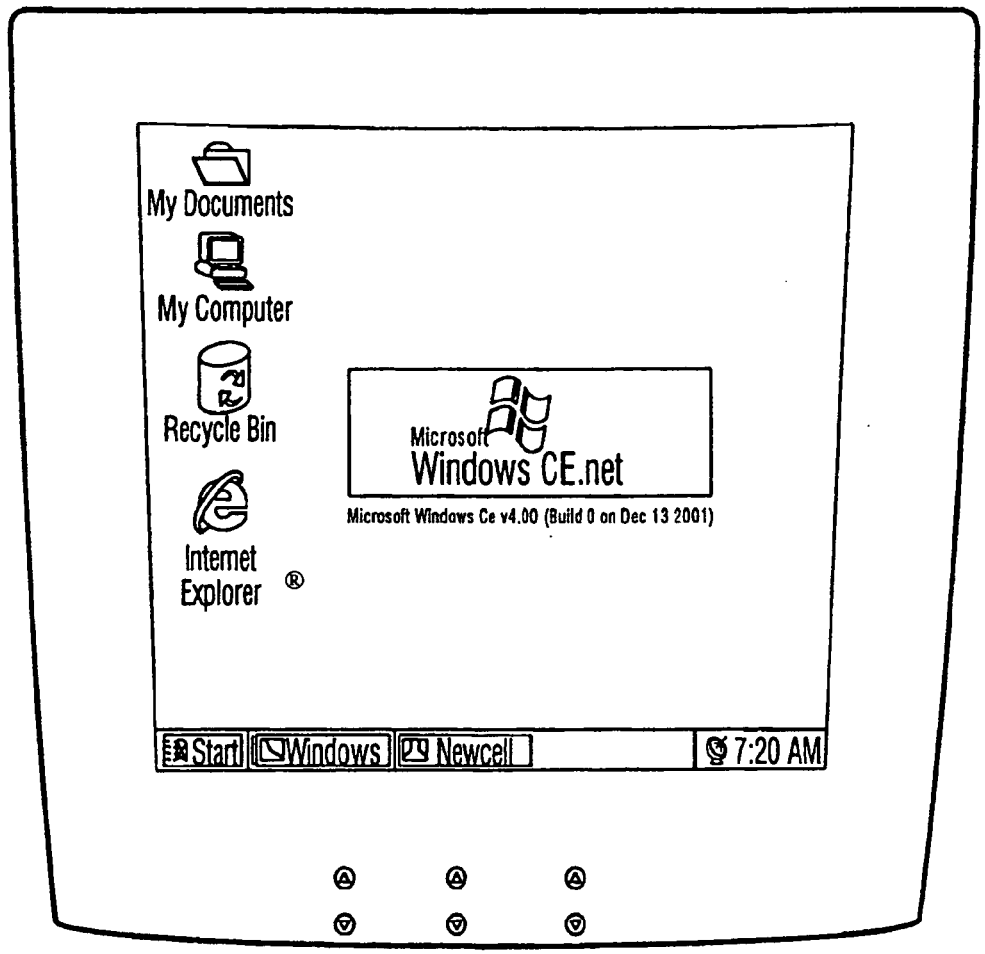

When the user determines that he or she desires to run the WINDOWS XP® operating system, FIG. 4E, the user presses the "Go to Desktop" button on the main menu, FIG. 4F, displayed on LCD, FIG. 4D, 307 and FIG. 3C, 307. The WINDOWS XP® operating system, FIG. 4E, resides on the hard disk, FIG. 3C, 325, utilizing the PENTIUM® III processor, FIG. 3C, 320, the Graphics and Memory Controller, FIG. 4D 321 and FIG. 3C, 321, and the 82801 Integrated Controller Hub, FIG. 3C, 322. The LCD, FIG. 4D, 307 and FIG. 3C, 307, are driven by the Graphics and Memory Controller FIG. 4D, 381 and FIG. 3C, 381. The main menu application, FIG. 4F, which uses the CE.NET operating system, FIG. 4G, and the STRONGARM Processor, FIG. 4D, 302 and FIG. 3C, 302, sends the request for a display mode change to the LCD Controller, FIG. 4D, 381 and FIG. 3C, 381, and then thru to the ASIC, FIG. 4D, 308 and FIG. 3C, 308. The ASIC, FIG. 4D, 308 and FIG. 3C, 308, receives the switch input signal and routes the signal to Function Blocks, FIG. 4D, 215–219. The switch signal is passed to the I/O Switch Signal, FIG. 4D, 220, which passes the request to Function Block, FIG. 4D, 219. Function Block, FIG. 4D, 219 determines the appropriate synchronization so that the "switch" will occur with the proper vertical timing signal to the Graphics Memory Controller, FIG. 4D, 321 and FIG. 3C, 321. The Graphics and Memory Controller, FIG. 4D, 321 and FIG. 3C, 321, receives the "switch request" from the ASIC, FIG. 3C, 308 and FIG. 4D, 308, moving from the Function Block, FIG. 4D, 219, thru the Switch Matrix, FIG. 15, 214, and I/O Blocks, FIG. 4D, 213, and is input to the Graphics and Memory Controller, FIG. 4D, 321 and FIG. 3C, 321. The Graphics Memory Controller, FIG. 4D, 321, and FIG. 4D, 321, then sends the output display data in a 24 bit format, and is passed thru the ASIC 110, FIG. 4D, 213, and the Switch Matrix, FIG. 4D, 214, to one of the Function Blocks, FIG. 4D, 215–219, to make the data translation from 24 bit wide data to 18 bit wide data. Once the translation has been processed, the 18 bit wide data, in the correct format is passed back to the Switch Matrix, FIG. 4D, 214, and the 1/0 Block (FIG. 4D, 213, to the LCD, FIG. 4D, 307 and FIG. 4D, 307. At this point, the user is now seeing a representation of a PC desktop, FIG. 4E, on the LCD, FIG. 3C, 307 and FIG. 4D, 307.

FIG. 4D Reference Number Glossary

210: Application Specific Integrated Circuit (ASIC).

211: JTAG Controller used to receive programming input from JTAG port 221.

212: In-System Programming Controller used to route the Macrocell programming code to the correct Function Block.

213: Input/Output blocks that connect the ASIC to the appropriate I/O leads on the chip 212 or 214 or LCD 307.

214: The Switch Matrix determines which I/O lead sends and receives data from or to which Function Block.

215–219: Function Blocks that hold programming instructions.

220: I/O Switch Signal Block used for switching signals and passing the switch signal request to Function Block 16 219, which thru a decision tree determines which Function Block (215 thru 219) has the code to process the request. Note: The switching is synchronized in that the "switch" will occur only when the selected input has a vertical timing signal. This reduces the tearing of the LCD during the switch by "switching" display modes only when the LCD is to start at the top of the screen.

221: JTAG port has I/O leads to the JTAG Controller 211 for programming purposes.

302: STRONGARM Embedded Processor.

381: STRONGARM LCD Controller. The STRONGARM LCD Controller output is 16 bits wide plus 3 timing, and it is input only to the ASIC.

321: Graphics and Memory Controller for the PENTIUM® III Processor. The PENTIUM® III GMCH output is 24 bits wide plus 3 timing, and it is input only to the ASIC.

307: LCD, 18 bit, Transflective, 800×300 Half-SVGA, 65,000 Color, Liquid Crystal Diode Display. The ASIC output is 18 bits wide plus 3 timing, and it is output only to the LCD.

FIG. 3C Description of Block Diagrams

302: STRONGARM Processor

375: General Purpose Input/Output (GPIO).

376: Universal Serial Bus (USB) Channel 0.

377: Universal Asynchronous Receive and Transmit (UART) Channel 1.

378: Infrared Serial Port Channel 2.

379: Universal Asynchronous Receive and Transmit (UART) Channel 3.

302: STRONGARM LCD Controller

382: STRONGARM Memory Controller

373: STRONGARM Audio CODEC.

311: Static Random Access Memory (RAM).

327: Read Only Memory (ROM).

310: Synchronous Dynamic Random Access Memory (SDRAM).

308: Application Specific Integrated Circuit (ASIC) Complex Programmable Logic Device (CPLD).

375: General Purpose Input/Output (GPIO).

307: Liquid Crystal Diode (LCD) Display.

321: Graphics and Memory Controller Hub (GMCH).

322: Integrated Controller Hub (ICH).

372: Basic Input Output System (BIOS).

389: External Display

386: AC 97 Audio

387: Universal Serial Bus (USB) Controller.

388: Integrated Drive Electronics (IDE) Hard Disk Controller.

325: Hard Disk.

323: External Input/Output (I/O) Devices.

383: Compressor/Decompressor (CODEC) for the Integrated Controller Hub (ICH) (322)

384: Speaker.

385: Microphone.

373: Audio Compressor/Decompressor (CODEC) for STRONGARM (302) Processor CODEC Channel 4 (380).

396: Speaker.

395: Microphone.

398: BLUETOOTH® Personal Area Network (PAN).

306: Antenna.

390: Voice and Data Module General Packet Radio Service (GPRS) and GSM.

311: Static Random Access Memory (RAM).

C. Operating Systems

As a feature of certain embodiments of the invention disclosed in application Ser. No. 09/809,963, device 300 operates by using two processors, each utilizing its own operating system. This allows device 300 to take advantage of the "best of breed" from both embedded and non-embedded operating environments. For example, the embedded operating system of system processor 302 is self-contained, and the software applications that run within the embedded operating environment are considered "closed." Specifically, in a "closed" environment, the software used is specified by the developer of the embedded system and may not be upgraded or modified by the user of the embedded operating system. In addition, no new software may be introduced to the embedded system by the user; the WINDOWS CE® operating system and OUTLOOK® for the PocketPC are respectively examples of a "closed" embedded operating system and a "closed" embedded software application residing in a "closed" environment.

The ability to debug and test an embedded system without the concern of a user introducing to the system new software or modifications, or patches (which could introduce bugs or viruses to the embedded system) make the ability to create a stable operating environment much easier by orders of magnitude, compared to an "open" software environment. Therefore, by definition, an embedded operating environment is inherently more reliable and stable than a non-embedded operating environment for the reasons described above.

Device 300 has been designed to take full advantage of the "closed" embedded environment by using an embedded operating system and embedded software applications that are considered to be "simple" and "high-use" applications, as it regards duty-cycle usage. More importantly, device 300 has been designed to take full advantage of the "closed" embedded environment for such functions as cellular telephone calls, scheduling appointments, sending and receiving email, and web browsing. In addition to the reliability benefits, which are tremendous, the embedded environment has dramatically lower power consumption, when compared to processor 320 and its related components, if used to perform the same tasks.

Conversely in an "open" software operating environment, such as in the case with the PC module (processor 320 and its related devices 321, 322, and 325), the user is free to add, modify and delete software applications and data files at will. Device 300 has also provided to the user an "open" operating environment, with an industry standard operating system, allowing for the use of industry standard software. The user of device 300 is free to load and manipulate software and data files that reside in the "open" operating environment of the PC module without fear of corrupting the core functionality of the entire device. The "open" environment provides a tremendous amount of PC use flexibility. However, unfortunately, since there is no guarantee of compatibility between the new software being introduced or modified in the "open" environment, or no guarantee of compatibility between the new software and the previously provided software, it increases the possibility of system failures. This is one reason why, in addition to greater power consumption, the PC module 320 is not used as the system processor/controller exclusively in device 300.

1. Voice Command

In one embodiment, voice command and control are provided in one or both the embedded operating environment of system processor 302 and non-embedded operating environment of processor 320. When used in both operating system environments, a seamless voice command and control user experience is achieved, regardless of the operating mode of device 300. In one embodiment, voice recognition is provided as well, for example by way of voice recognition software run by processor 320.

2. Power and Thermal Management

Power management is significant in that device 300 includes a number of elements which need not always be powered. By selectively powering down certain elements, the useful life of battery 301 is extended considerably. Table 1 shows, by way of example, a variety of functions and the associated power management scheme for various modules. For example, in one embodiment while mobile and using power available via battery 301, the WINDOWS CE® operating system is used in conjunction with system processor 302, memory 310, ROM 327 (containing for example BIOS), and hard disk drive 325 for the major computing tasks. Computing tasks for use in this mode typically include email, contact management, calendar functions, and wireless browsing. In this operating environment, power is managed by putting the other modules into a sleep mode or turning them completely off.

Synchronization of the data files between the embedded WINDOWS CE® and the WINDOWS XP® PC modules is accomplished by turning the PC module "On" and using customized synchronization software to update the WINDOWS XP® PC module data files. There are certain user functions that are shared between the two operating environments of WINDOWS CE® and WINDOWS XP®. These functions include, but are not limited to, for example, the OUTLOOK® data file, which includes contact management, email and calendar data, and favorite site data, stored in a web browser such as one sold under the tradename INTERNET EXPLORER® and available from Microsoft Corporation.

The device 300 is a dual processing device that utilizes an Embedded processor and a processor having the operational characteristics of a PENTIUM® processor, LCD, Memory, Voice and Data module, Hard Disk and Battery, all contained in a small form-factor of 6.25"×2.5"×0.91". These components draw approximately 5.75 watts of power, and could generate internal temperatures up to 1000 degrees Fahrenheit. These components create hot spots on the device, and without proper thermal management, which would cause electrical and mechanical failure of the device 300. The hot spots are typically located in close proximity to the devices, but can also occur elsewhere.

There are many variables that affect the temperatures of device 300. Thru thermal modeling, shown in FIGS. 5A thru G, it was determined that the best method of managing the heat generated in device 300 was to make the bottom-casing an aluminum case. The case is the heat sink for device 300. Aluminum was chosen for its thermal characteristics, as well as it is a light-weight metal.

Thermal modeling showed that by adding features, e.g. dimples or undulations, to the bottom casing, the case's ability to dissipate heat was increased by approximately 25%. This created a dramatic increase in thermal management capability, improving component life expectancy, as well as eliminating problems associated with traditional methods of heat removal. An example of a traditional method would be to include a small 400 fpm fan, as shown in FIG. 8B, 850, that would cool the device internally. This method would keep the device cool, but draw a significant amount of power, and increase the form-factor X, Y, and Z dimensions. In addition, since device 300 is also used as a Cell Phone, there was the potential problem of the fan creating noise that would interfere with the user's ability to communicate with a caller.

Figure 5A:
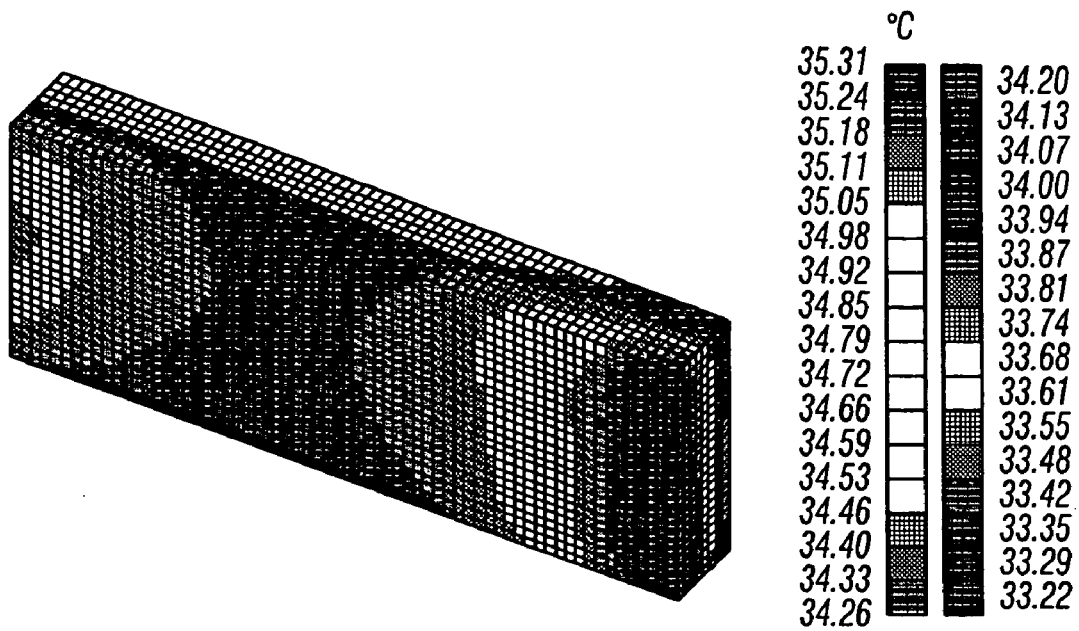
FIG. 5A-G depicts one embodiment of the invention and shows the thermal characteristics of this embodiment.
Figure 5B:
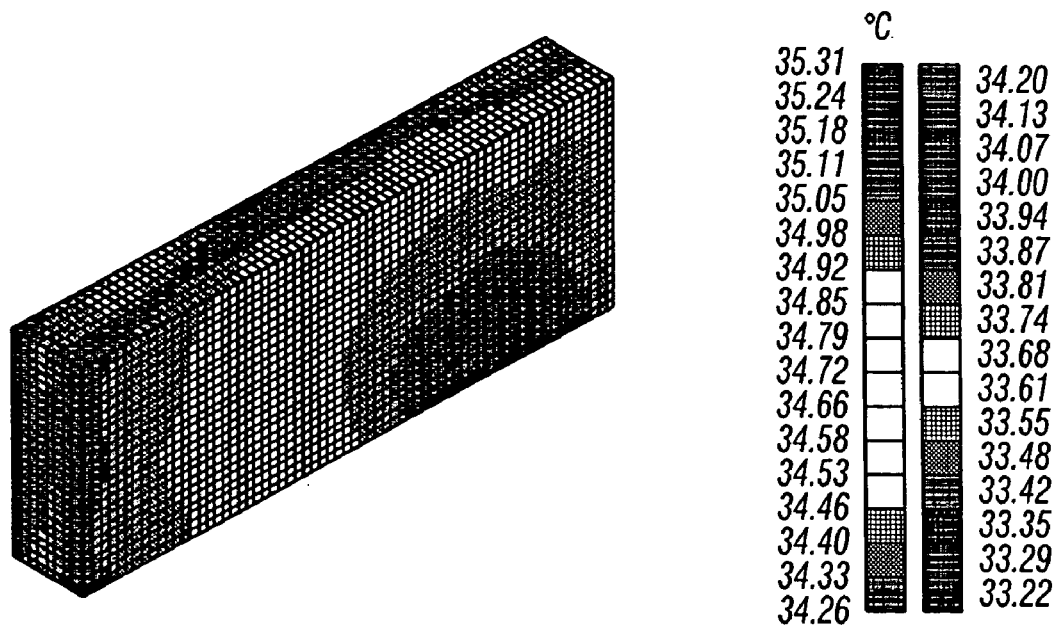
Figure 5C:
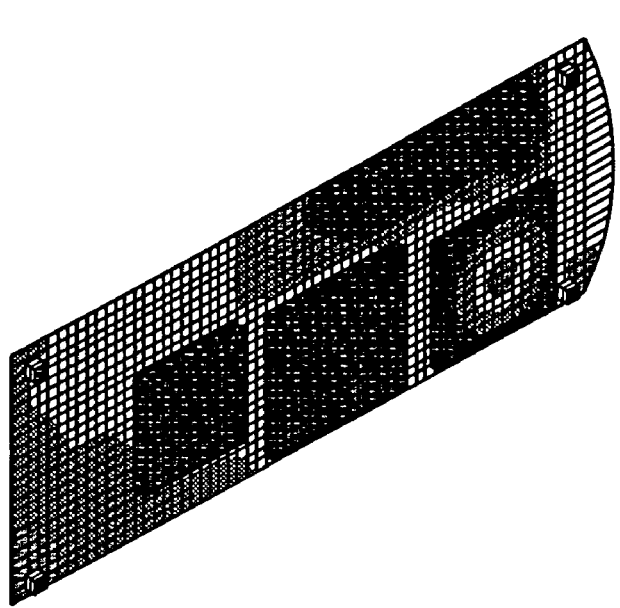
Figure 5D:
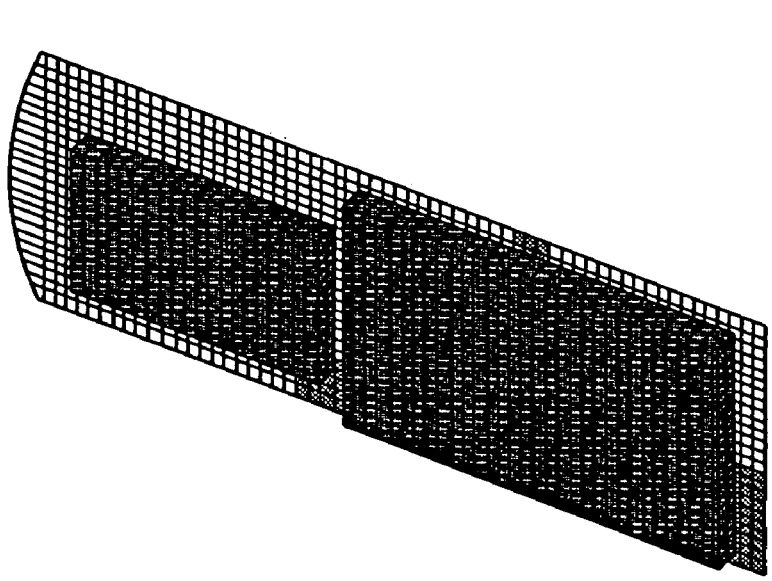
Figure 5E:
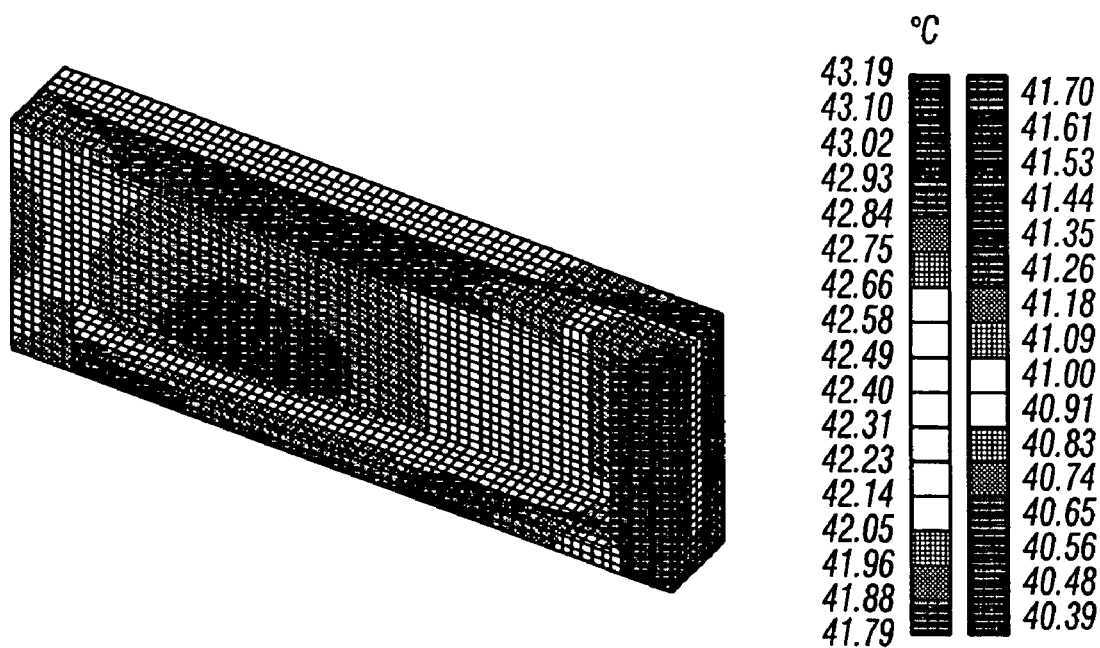
Figure 5F:
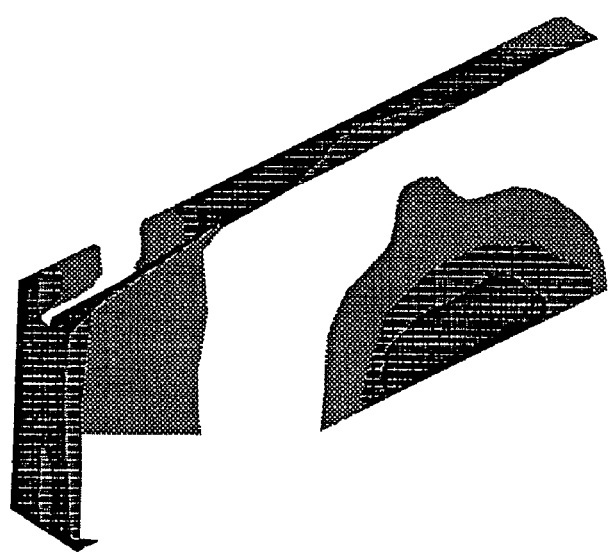
Figure 5G:
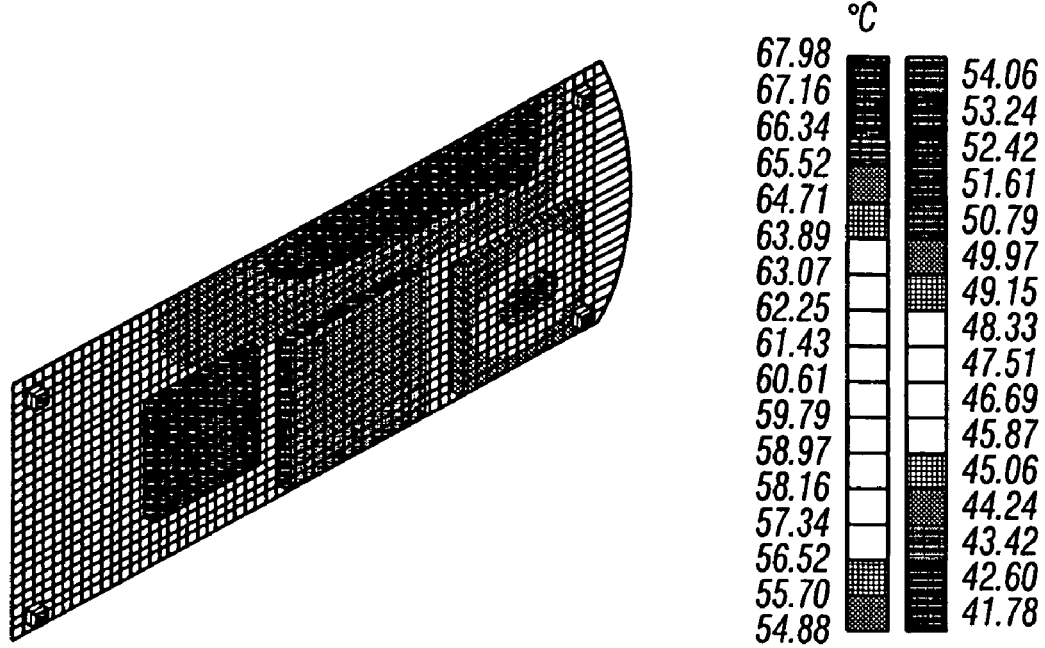
Figure 5H:
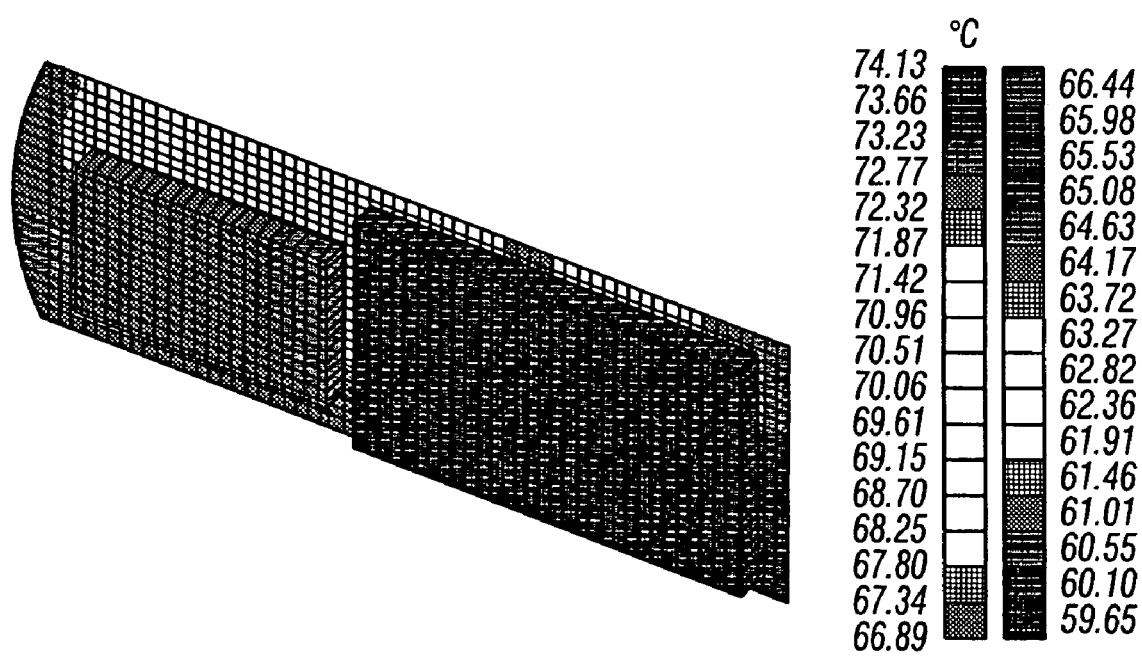
FIG. 5I depicts one embodiment of the invention and shows the use of a temperature sensing diode to determine if the processor temperature exceeds the threshold for the overall temperature of the device.
Figure 5I:
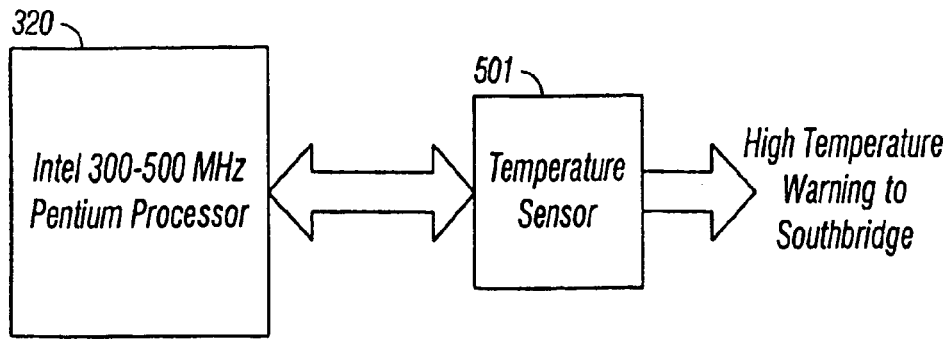

A temperature sensing diode, as shown in FIG. 5I, 501, may also be used to control the, internal heat of device 300. Under unforeseeable conditions the processor 320, could exceed its normal power consumption due to heavy processing required by a software application. This may cause the internal temperature to exceed 140 degrees Fahrenheit. Under these conditions, the casing may not be able to dissipate the heat quickly enough to keep the internal temperature below 140 degrees. The circuitry used with the temperature sensing diode determines the threshold limit and turns OFF/ON the clock for processor 320 periodically, reducing the Megahertz speed of the processor 320 until the internal temperature drops below the threshold limit of 140 degrees Fahrenheit. In this manner, the processor 320 continues to process information, but the speed is reduced until the internal temperature falls back to acceptable limits.

Two studies focused on a 4.216 Watt and 7.886 Watt power dissipation. When the prototype of device 300 was built, the actual temperature was measured and at 6.5 Watts, device 300 measured a maximum back-side external temperature of 104 degrees Fahrenheit and a front-side external temperature of 86 degrees Fahrenheit. This implies that based on the thermal analysis, and the actual prototype temperature, at 5.75 Watts the external back-side temperature will be 100.4 degrees and the front-side temperature will remain at 86 degrees. The results of the thermal analysis are shown in FIGS. 5A thru G.

3. Applications

The applications that are used to perform the functions described above are redundant in that they exist within each operating environment. These applications, although identical in functionality, are, from a software architecture perspective, dramatically different in nature and have been programmed to maximize their use in each environment. Specifically, the embedded version of OUTLOOK®, in the WINDOWS CE® operating environment, for example, has been optimized with the smallest footprint in memory in order to operate the application in an environment having a less powerful processor and limited memory. Such is not the case with the WINDOWS XP® OUTLOOK® version, where a complete WINDOWS® object library is used to construct the OUTLOOK® application. If redundant or unused object functionality is loaded and processed into memory, the inefficiencies are ignored because since the PC processor is so fast, there is no cost benefit to optimization. In accordance with the invention disclosed in application Ser. No. 09/809,963, in order to ensure the best user experience and maintain the highest level of functionality, such application data is seamlessly and silently updated and synchronized between the two operating systems and applications.

D. Connection and Communications

1. Standalone

Figure 6:
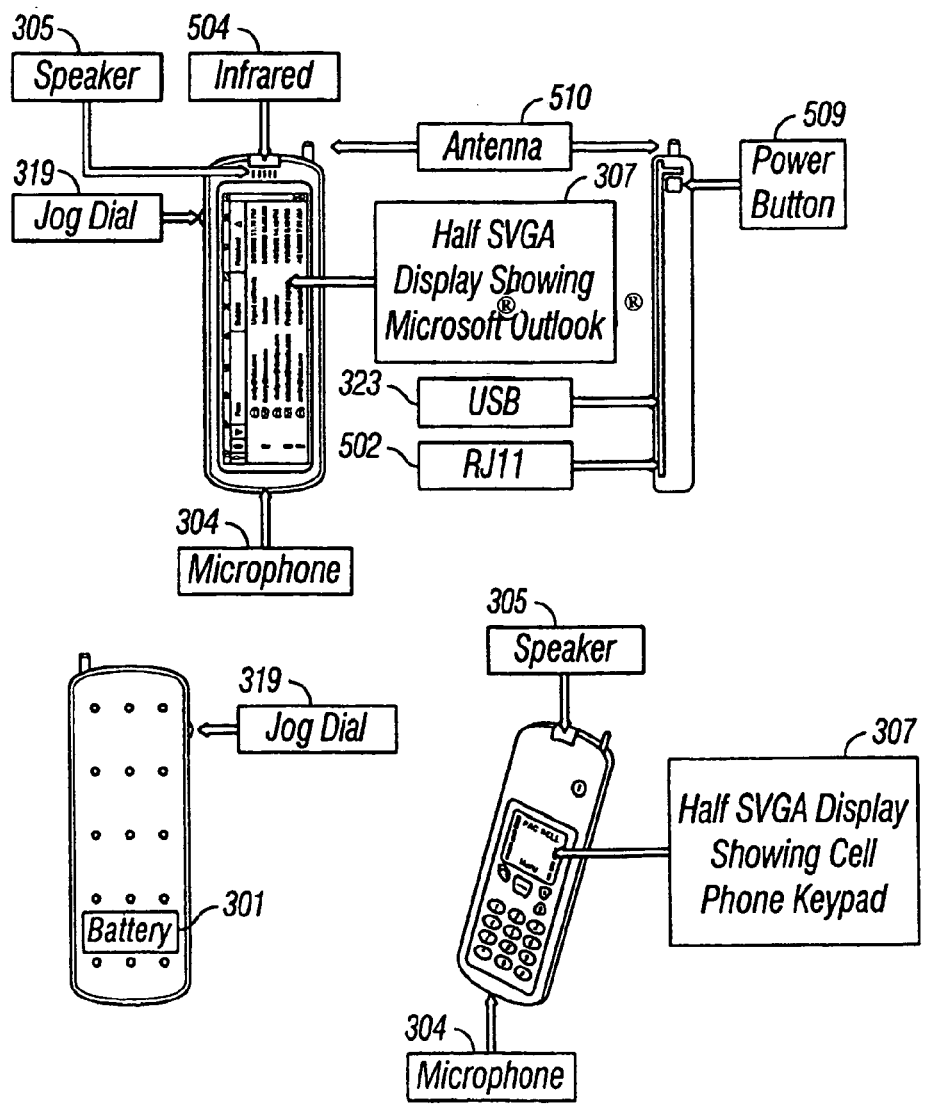
FIG. 6 depicts one embodiment of the invention that shows the features and functions of the device.

FIG. 6 is a diagram depicting one embodiment of the present invention, including jog dial 319, RJ11 Jack 502 for connection to, for example, a telephone line or network interface, and USB connection 323. In addition, microphone 304 and speaker 305, infrared for remote control and data synchronization 504, display 307, antenna 510, an power on/off are shown.

Figure 7A:
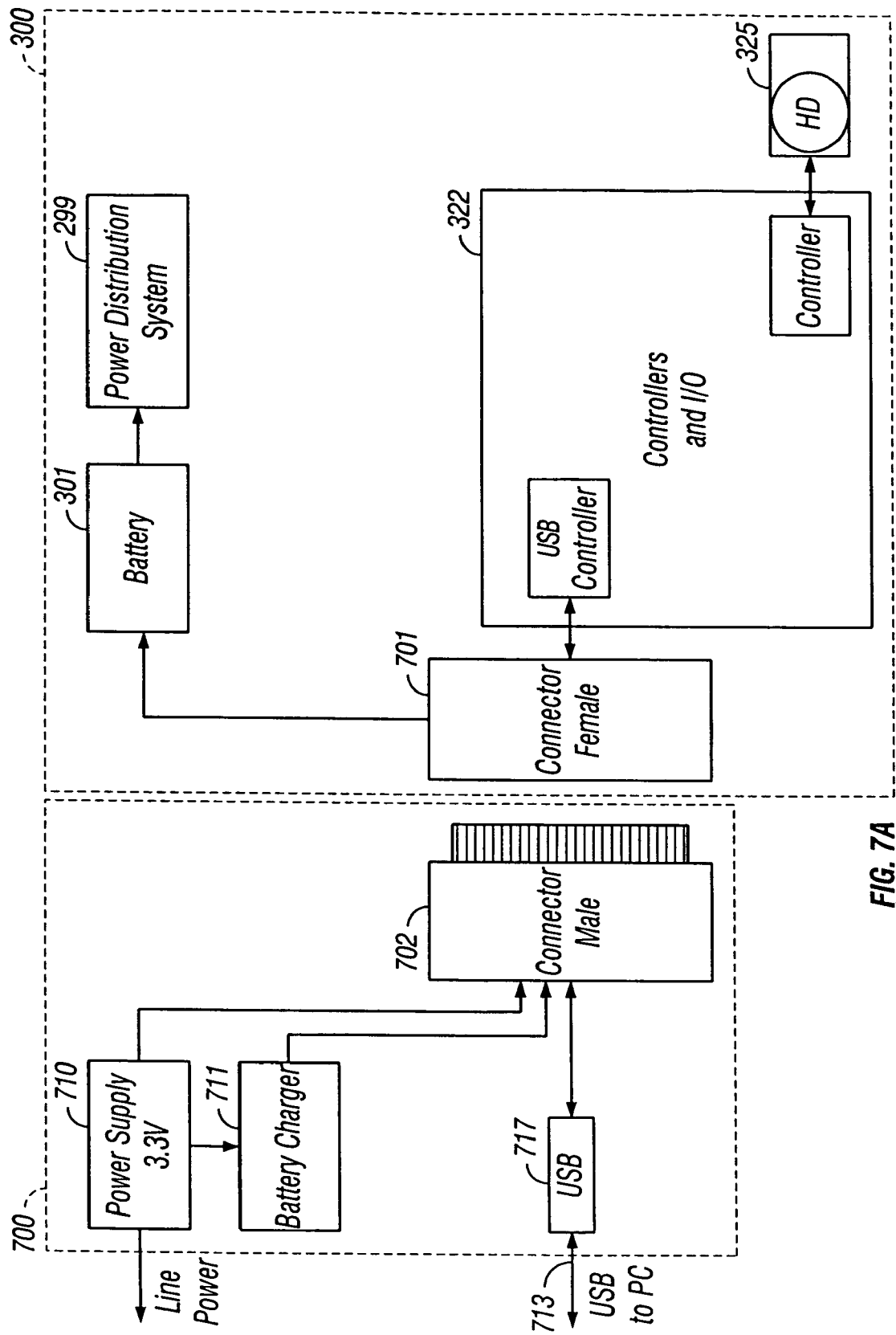
FIG. 7A is a block diagram depicting one embodiment in which the novel personal electronic device used in conjunction with an external battery charger.
Figure 7B:
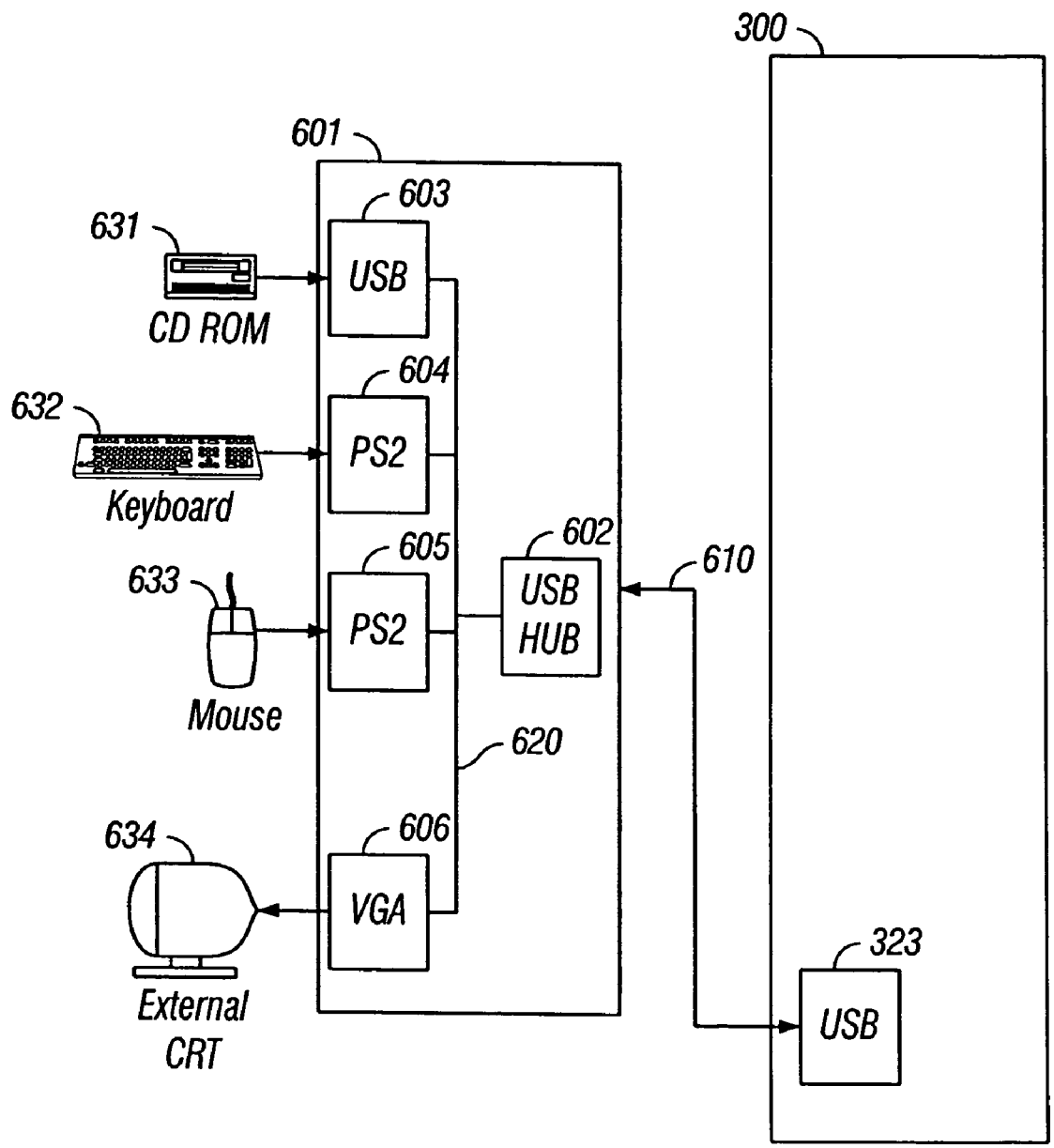
FIG. 7B is a block diagram depicting one embodiment in which the novel personal electronic device used in conjunction with external computer accessories.

FIGS. 7A–B are diagrams depicting the device 300 used in conjunction with other systems and accessories. FIG. 7A is a block diagram depicting one embodiment in which the novel personal electronic device used in conjunction with an external battery charger. FIG. 7B is a diagram depicting device 300 in use with external computer accessories, for example, when the user arrives at a home or business office and wishes to use more conventional I/O devices. In this environment, device 300 includes universal serial bus (USB) interface as external I/O interface 323. Docking strip 601 serves to interface between external I/O modules and device 300. As shown in FIG. 7B, docking strip 601 includes a multi-port USB hub 602 which communicates via USB cable 610 with device 300. Multi-port USB hub 602 in turn interfaces to various external I/O interfaces, shown in this example as (a) USB interface 603, which is connected to, for example CD ROM drive 631, (b) PS/2 interface 604, which is connected to, for example keyboard 632, (c) PS/2 interface 605, which is connected to, in this example, mouse 633, and (d) VGA interface 606 which, in this embodiment, is connected to external CRT or LCD video display 634.

In this fashion, the simple, low power device 300 is able to be easily, and inexpensively, connected to a wide variety of external, and more conventional I/O devices, some examples of which are shown in the embodiment of FIG. 7B. In one embodiment, docking strip 601 receives what little power requirements it has, via USB cable 610 from device 300. In this embodiment, certain external I/O devices such as CD ROM drive 631 and display 634 receive their power from the AC supply, thereby not adding to the power requirements which must be met by device 300.

Figure 7C:
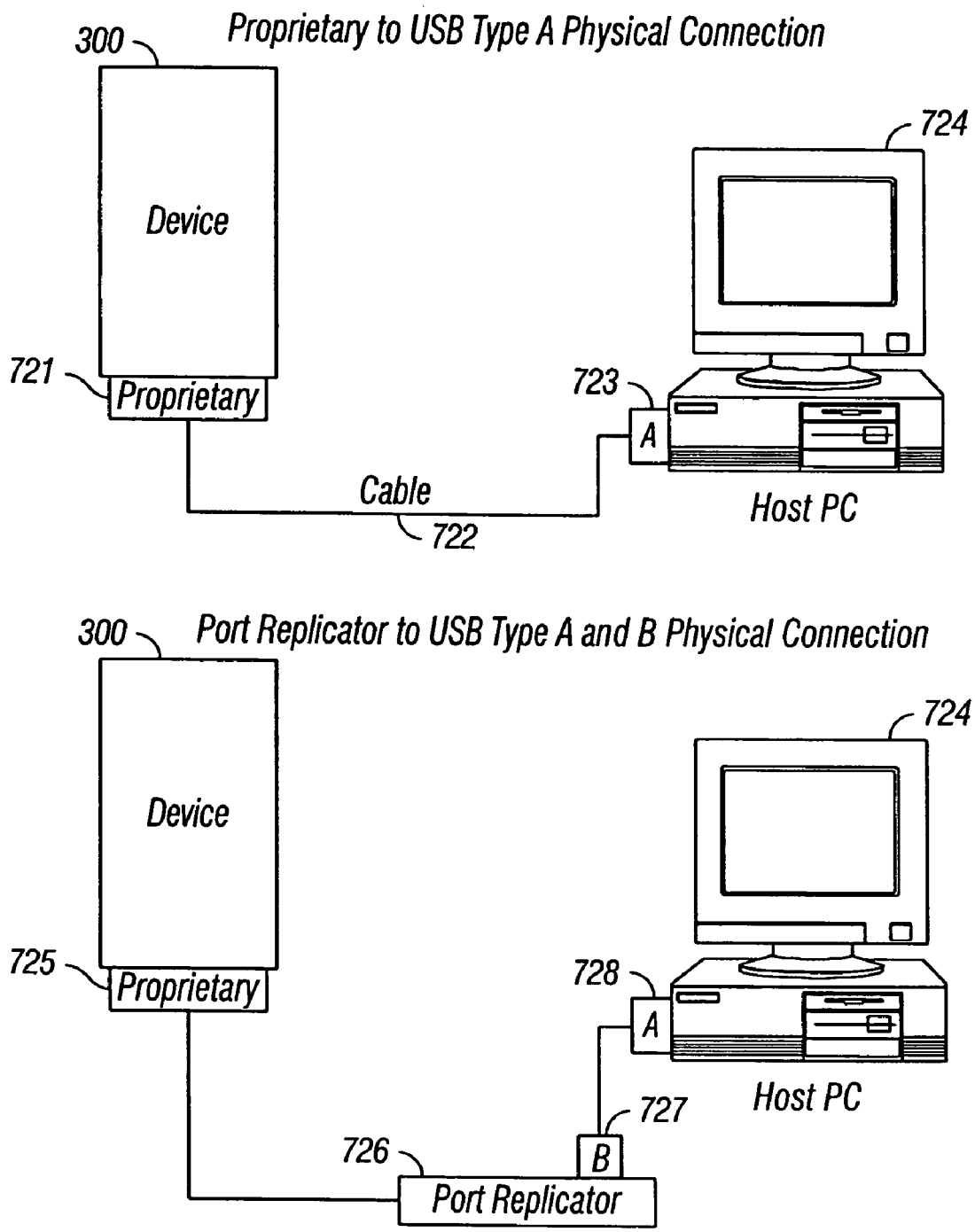
FIG. 7C is a block diagram depicting one embodiment in which the personal electronic device of the invention used in connection with a conventional computer through the use of an appliance interface unit.

FIG. 7C is a diagram depicting device 300 in use with another computer system so that, for example, the other computer system is able to access the memory and data storage elements of device 300. This is useful, for example, when a traveler returns to a fixed location, such as home or work office, hotel room, and so forth, and desires to utilize a standard computer system (which might include a network connection) to access the data within device 300. Conveniently, during this operation, battery 301 of device 300 can be recharged.

Referring back to FIG. 7A, appliance interface unit 700 serves to interface between a conventional computer, for example via USB cable 713, and device 300. In one embodiment, device 300 includes a connector 701, which serves to mate with connector 702 of appliance interface unit 700. Appliance interface unit 700 also includes power supply 710 and battery charger 711 (which in one embodiment are conveniently constructed as a single module), which receives power from an external power source and provides power, via connector 702 to connector 701 in order to charge battery 301 within device 300. This battery charging is conveniently performed while the external computer system is accessing the memory and storage device (such as hard disk drive 325) within device 300.

In one embodiment of the invention, device 300 can act as an external hard disk to an existing PC by communicating to the PC via a Universal Serial Bus (USB). Physically, the connectivity can be accomplished in one of two ways as follows, and is also shown in FIG. 7C.

1. Proprietary cable: The proprietary connector on device 300 is connected to a Type B USB connector on the PC. The proprietary connector circuitry 721 is designed to emulate a Type A USB connector. To the PC, device 300 is an external USB hard disk.

2. Port Replicator Connection: The proprietary connector 725 is connected to the Port Replicator 726. The USB Type B connector 727 is attached, via a standard USB cable to the USB Type A 728 connector on the PC. To the PC, the device 300 is an external USB hard disk.

Figure 7D:
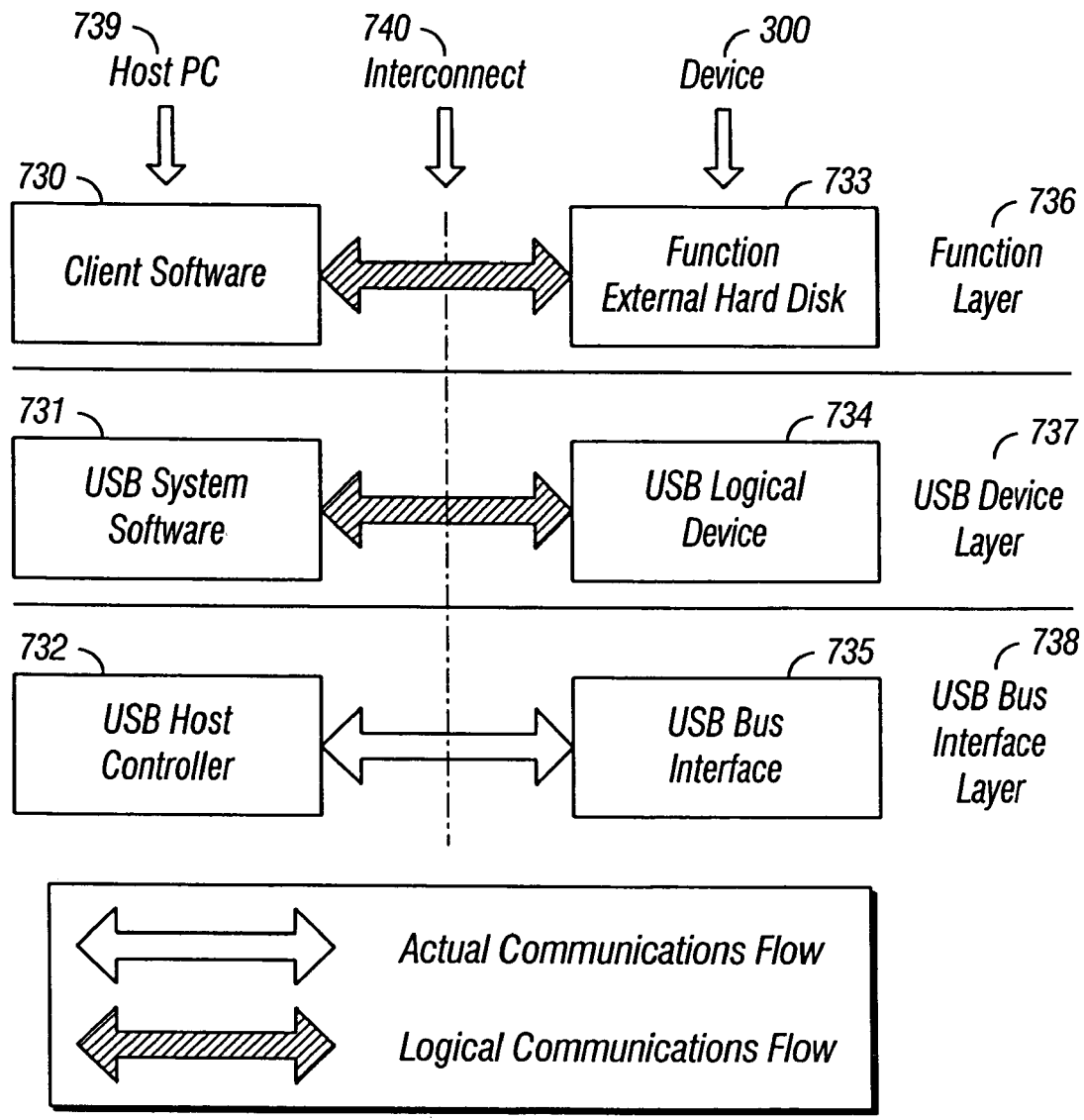
FIG. 7D is a diagram showing the USB layers of connectivity between the personal electronic device and the host PC.

FIG. 7D shows an overview of the USB, identifying different layers of the connectivity between the device 300 and a PC.

USB Physical Device: Device 300 is viewed by the PC as a piece of hardware. In this example, the Host PC 739 sees device 300 as an external hard disk.

Client Software 730: This is a piece of software that executes on the host PC, corresponding to a USB device, in this example device 300. This software is provided along with device 300 to be loaded by the end-user onto an operating system such as those available from Microsoft Corporation under the trademarks WINDOWS ME®, WINDOWS XP® or the tradename WINDOWS® 2000.

USB System Software 731: This is the software that supports the USB in a particular operating system. This software is provided by the Microsoft Corporation in the WINDOWS ME®, WINDOWS XP® and WINDOWS® 2000 operating systems. The software supplied in the operating system, is independent of particular USB devices or client software.

USB Host Controller 732 (Host Side Bus Interface): The hardware and software that allows USB devices to be attached to a host PC.

As shown in FIG. 7D, the connection of a host PC to a device requires interaction between a number of layers and entities. The USB Bus Interface Layer 738 provides physical/signaling/packet connectivity between the host PC 739 and device 300. The USB Device Layer 737 is the view the USB System Software 731 has for performing generic USB operations with a device, in this example, device 300. The Function Layer 736 within the device 300 provides additional capabilities to the host PC 739 via appropriately matched Client Software 730 that resides on the host PC 739. In this example, the Client Software 730 on the host PC 739 is matching to an external hard disk. The USB Device 737 and Function Layers 736 each have a view of logical communication within their respective layers that actually uses the USB Bus Interface Layer 738 to accomplish data transfer.

There are shared rights and responsibilities between the four USB system components. Since this is a standard Universal Serial Bus, device 300 conforms to the standard in order to communicate to any USB enabled PC as an external USB hard disk by providing the Client Software 730 to the host PC 739, and within device 300 itself provides for the Function Layer 736. In this manner, the USB enabled PC knows that when physically connected via the methods described above, device 300 is viewed as an external hard disk.

In order for device 300 to function as an external hard disk, the non-embedded processor 320 and associated circuitry needs to be turned "ON." This can be accomplished by the User booting the WINDOWS XP® operating system on the device 300 either before or after connecting the device 300 to the host USB enabled PC.

2. Docking Station

Figures 1, 8A:
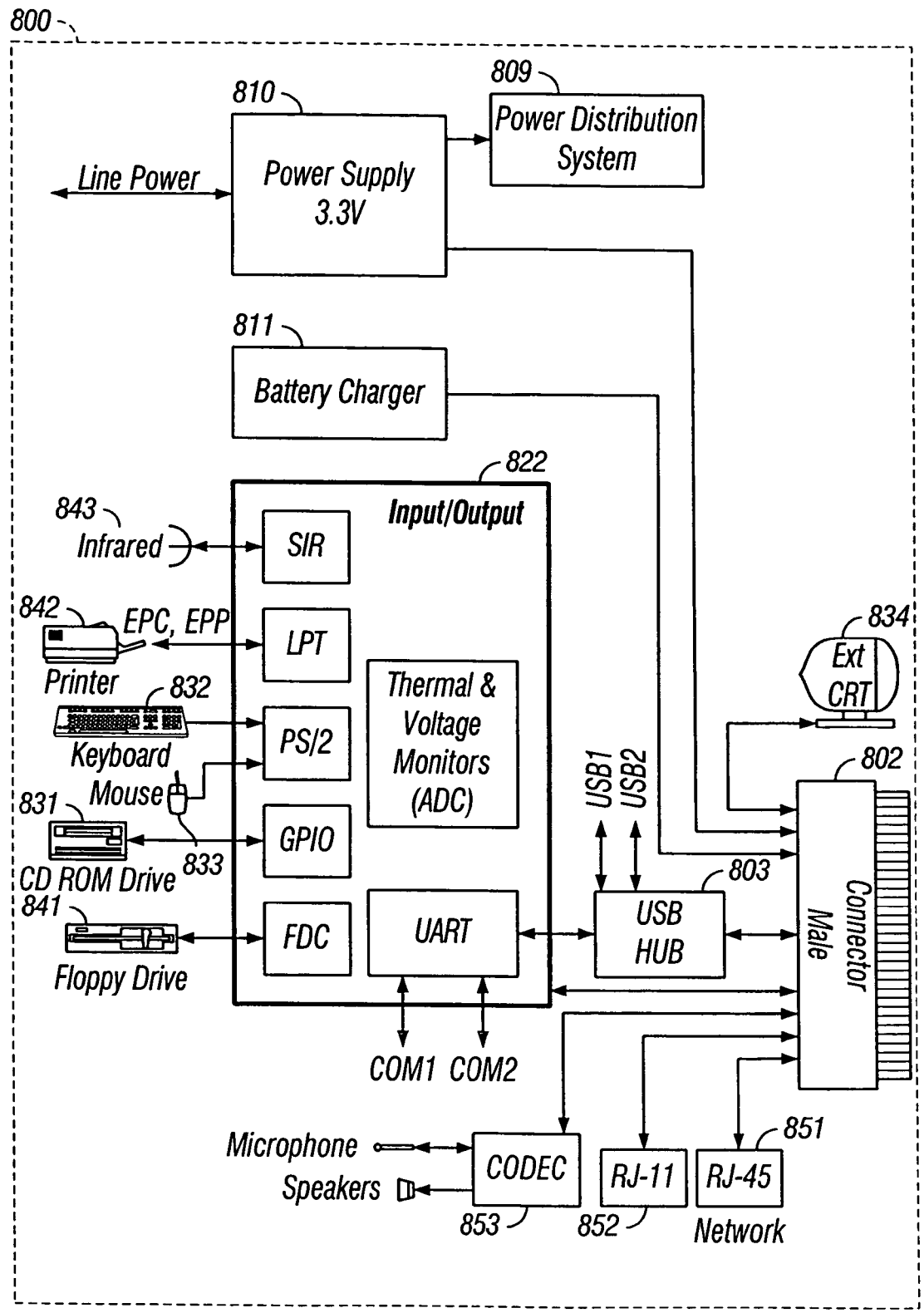
FIG. 8A is a diagram depicting one embodiment of the invention which includes a personal electronic device in conjunction with a docking station.
Figures 2, 8A:
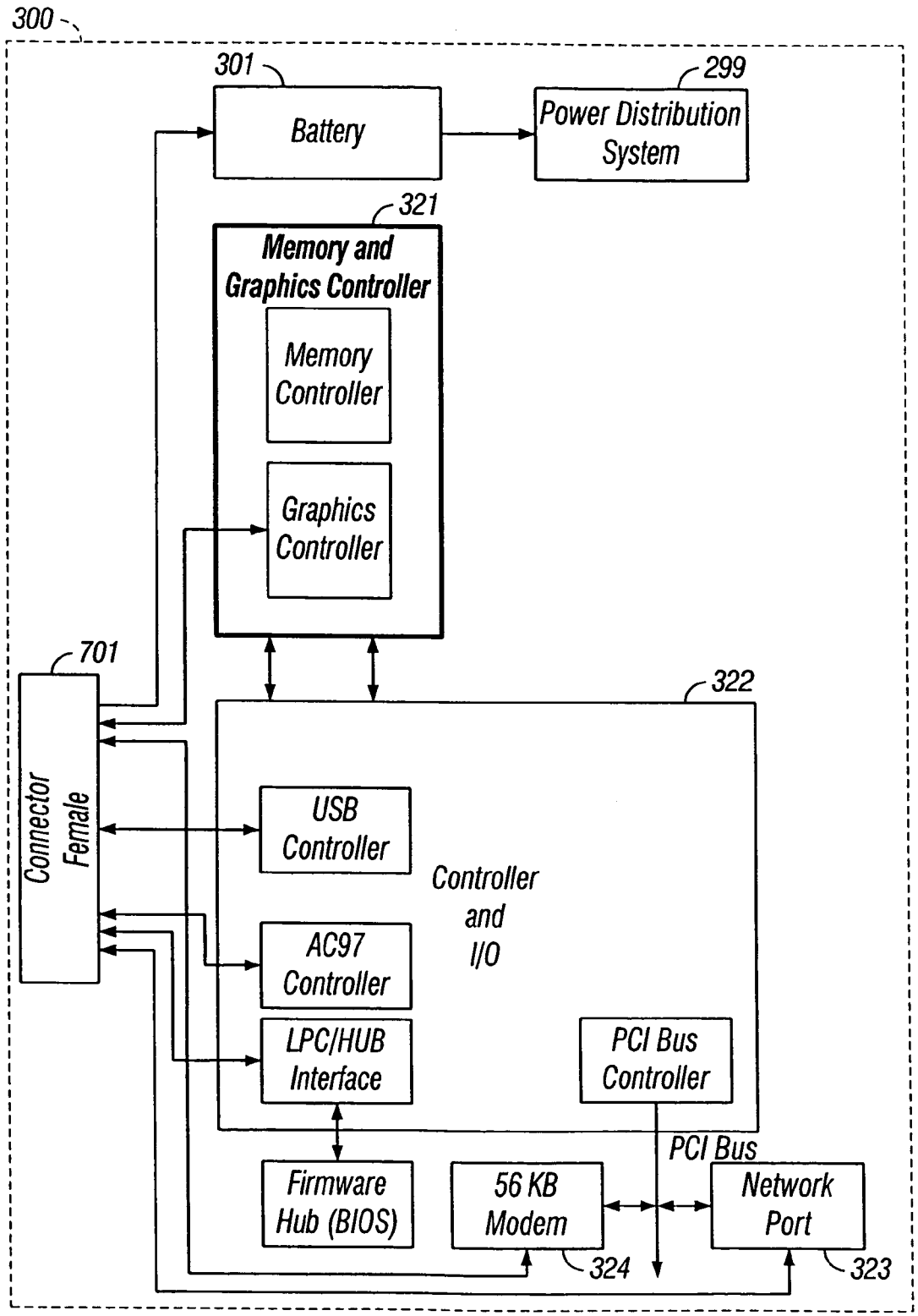
Figures 1, 8B:
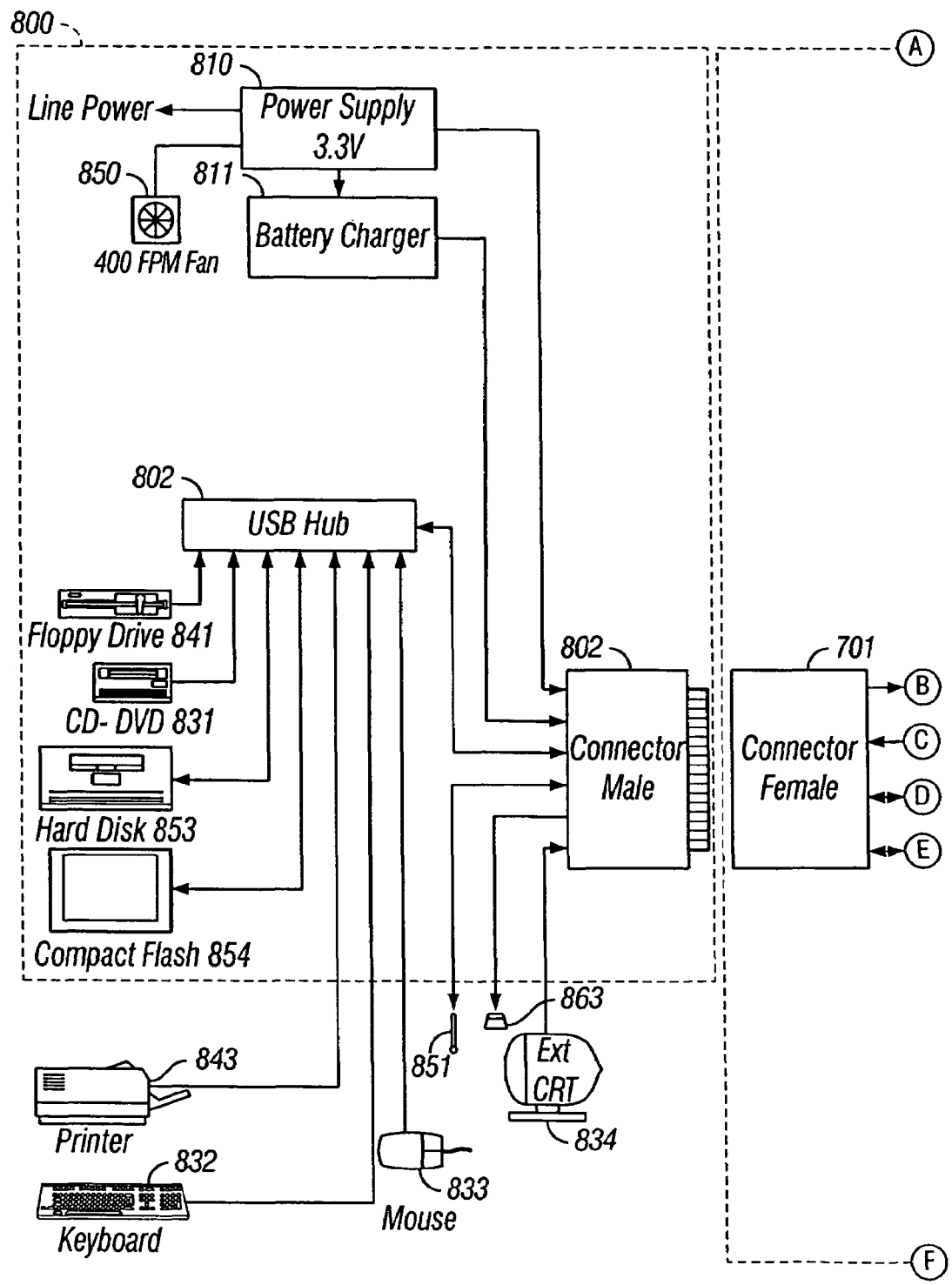
FIG. 8B is a diagram depicting one embodiment where the docking shell incorporates the use of a fan to keep the device cool while using the Pentium class processor at higher processing speeds.
Figures 2, 8B:
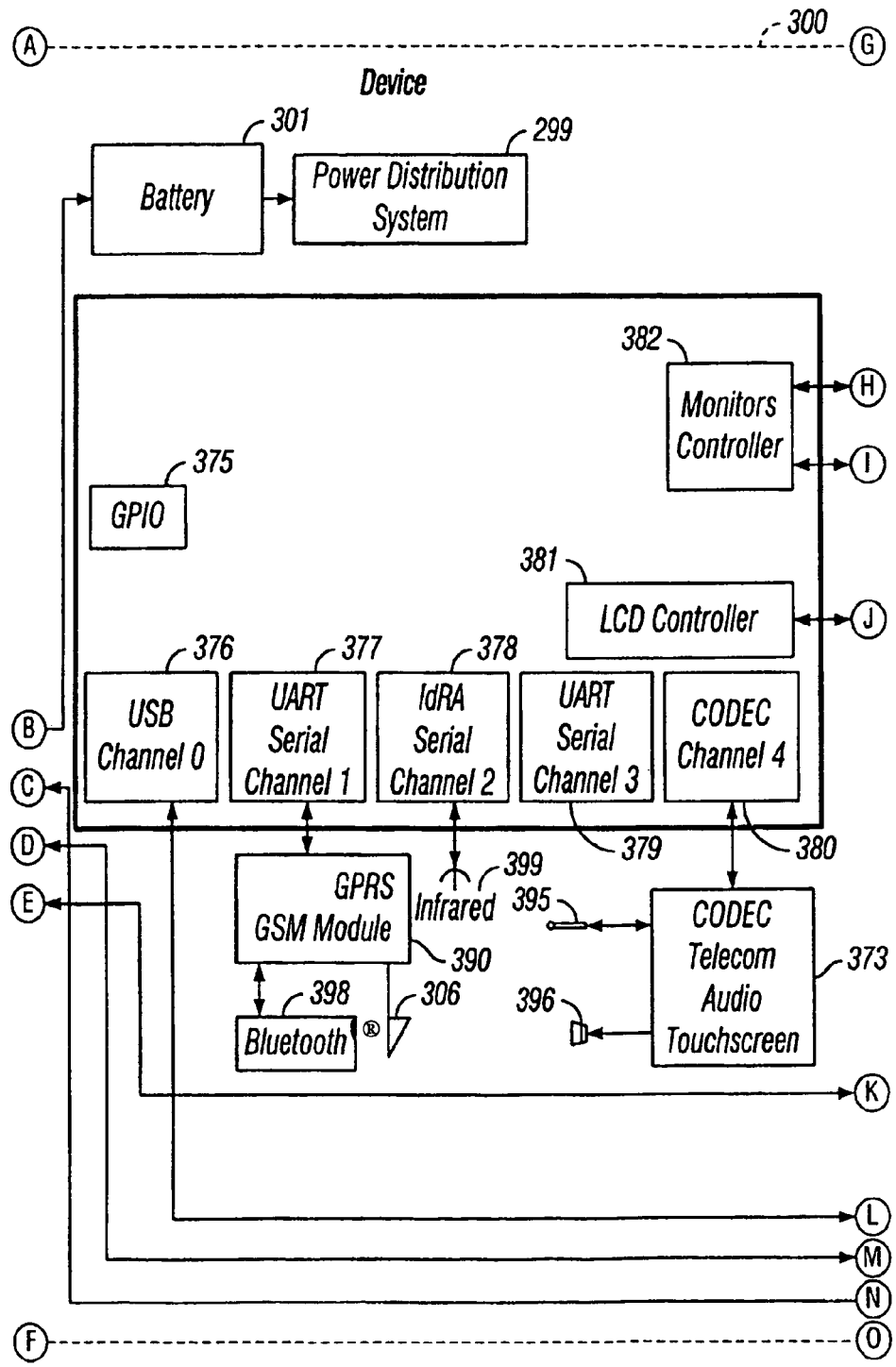
Figures 3, 8B:
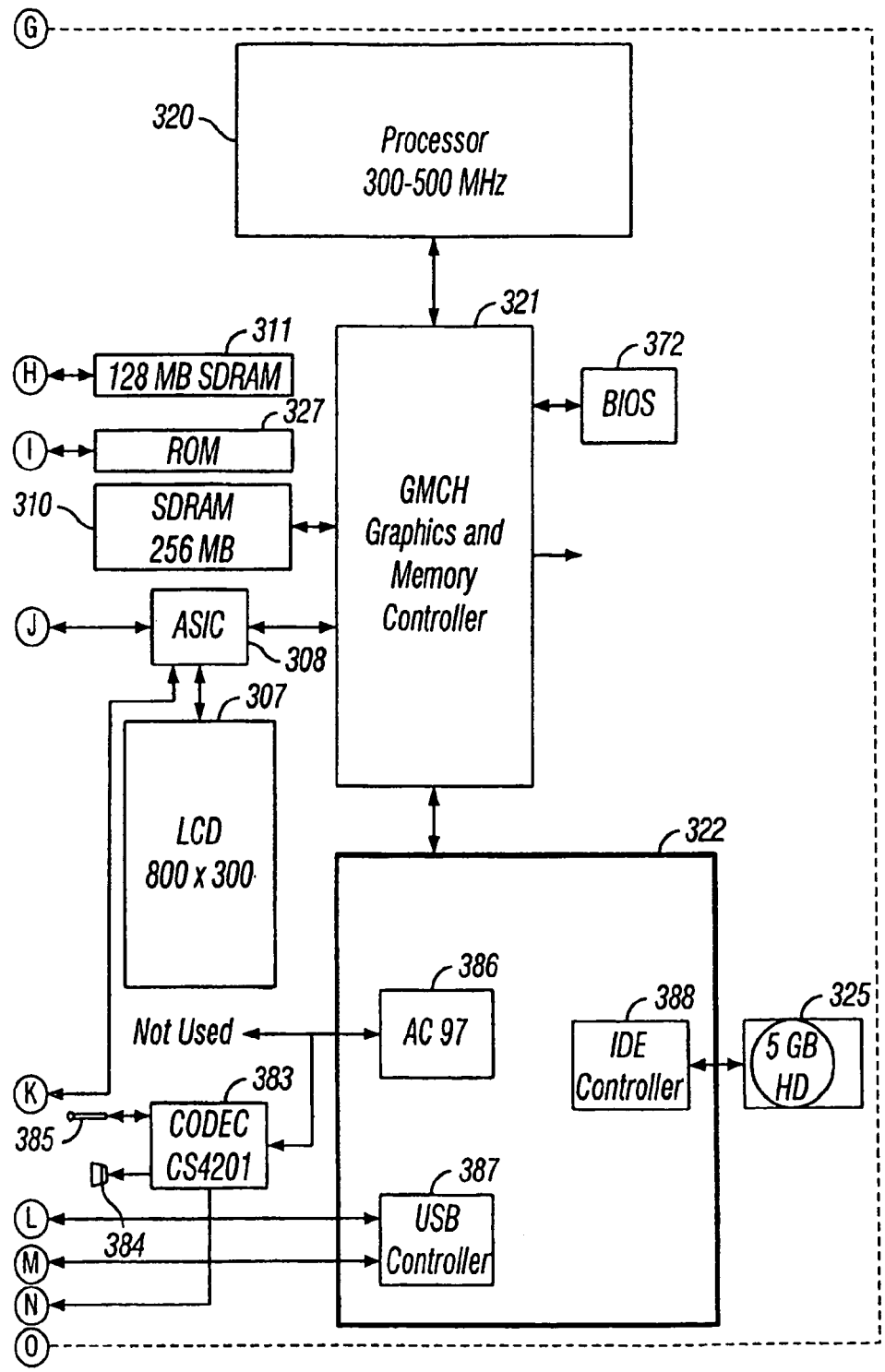

FIG. 8A is a block diagram showing one embodiment of a docking station 800 for use with device 300. Various elements contained within device 300 are shown, which have particularly relevance to interconnection with docking station 800. Also shown within device 300 is a network port (for example, Ethernet port) serving as external I/O interface 323. Docking station 800 includes connector 802 for connection to device 300 via its connector 701. In one embodiment, docking station 800 includes power supply 810 and battery charger 811, which in one embodiment are fabricated as a single module and which receive power from an external source in order to supply docking station 800, as well as provide battery charging current to device 300.

Docking station 800 includes, for example, an external CRT or LCD display 834 and USB hub 803 for connection with device 300 controller and I/O module 322. USB hub 803 connects to docking station I/O module 822 and other USB devices, if desired. Alternatively, I/O module 822 of docking station 800 is connected to device 300 via LPC bus 862 as an alternative interface. Other types of interfaces can be used as well. I/O module 822 serves to communicate with device 300 and various I/O modules shown, by way of example, as infrared I/O module 843, printer 842, keyboard 832, mouse 833, CD ROM drive 831, and floppy drive 841. Any other desired I/O modules can, of course, be used in a similar fashion.

In the embodiment shown, external I/O module 323 of device 300 is a network port, for example an Ethernet port. This network port is coupled via connectors 701 and 802 to network connection 851, allowing device 300 to be connected to a network. In the embodiment shown in FIG. 8, device 300 includes modem 324 which is connected to a telephone line 852 by a connection through connectors 701 and 802. In the embodiment shown in FIG. 8, docking station 800 includes its own CODEC 853, as well as one or more microphones and one or more speakers, allowing the audio input-output to be performed with elements of docking station 800, rather than integral elements of device 300.

In one embodiment, when device 300 is docked with docking station 800, display controller 308 automatically turns off display 307 and uses the docking station monitor 834. Display controller 308 automatically provides display signals to docking station monitor 834 to provide a full SVGA display of 800×600. If desired, docking station monitor 834 is custom configurable through the use of display controller 308 to set the docking station monitor 834 at higher resolutions.

In one embodiment, when device 300 is docked within docking station 800, telephone module 390 is able to be used concurrently with the landline based telephone connection 852, allowing, for example, a voice telephone call to be made concurrently with a modem connection, and two concurrent (and/or conjoined) telephone connections.

In another embodiment, FIG. 8B, shows when device 300 is docked with docking station 800, display controller 308 automatically turns off display 307 and uses the docking station monitor 834. Display controller 308 automatically provides display signals to docking station monitor 834 to provide a full SVGA display of 800×600. This embodiment shows all the peripheral attachments connected via a USB hub 802 and device 300 being cooled by a 400 fpm fan 850 used as part of Device 800, the docking shell.

In the disclosed embodiments, the device can include a terminal configured to receive a docked signal from a docking station, e.g. by the docking strip. In one aspect, when the device is docked, the embedded processor and non-embedded processor are configured to freely operate simultaneously in response to the docked signal. In another aspect, when the device is docked, the embedded processor increases the non-embedded processor clock rate in response to the docked signal. These increases in processor usage can cause an increase in the heat created by the device. Consequently, one aspect of the docking station including a fan is to turn on the fan in response to the device 300 being docked.

3. LAN Communications

Figure 9:
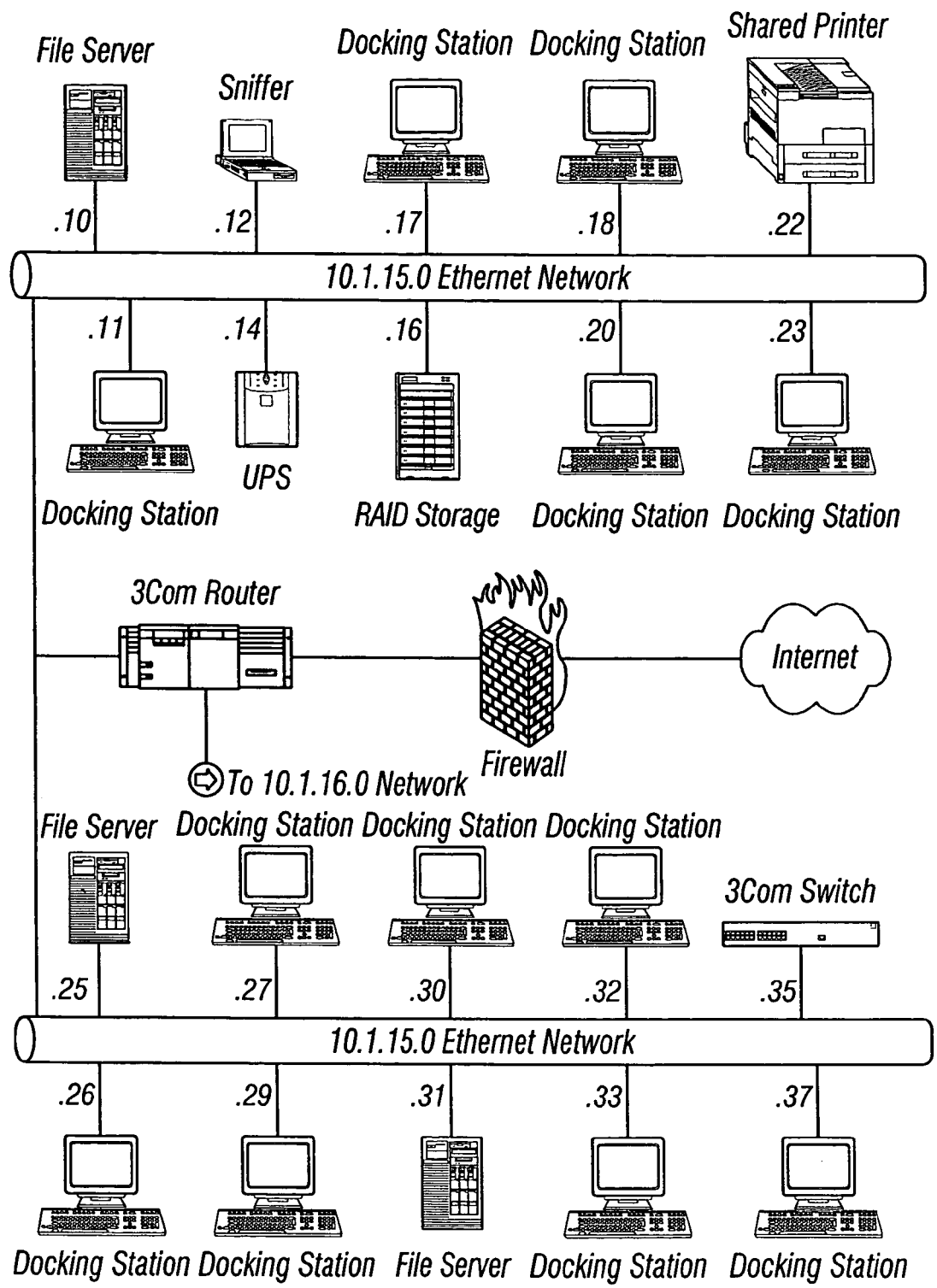
FIG. 9 is a block diagram which depicts one embodiment of a network and which includes one or more personal electronic devices.

FIG. 9 is a block diagram depicting a typical local area network (LAN), including one or more personal electronic devices of the present invention, which are connected to the network either directly, or via network drivers contained within the personal electronic device, a network connection contained in docking strip 601, or the network connection provided by docking station 800 of FIG. 8.

Figure 10:
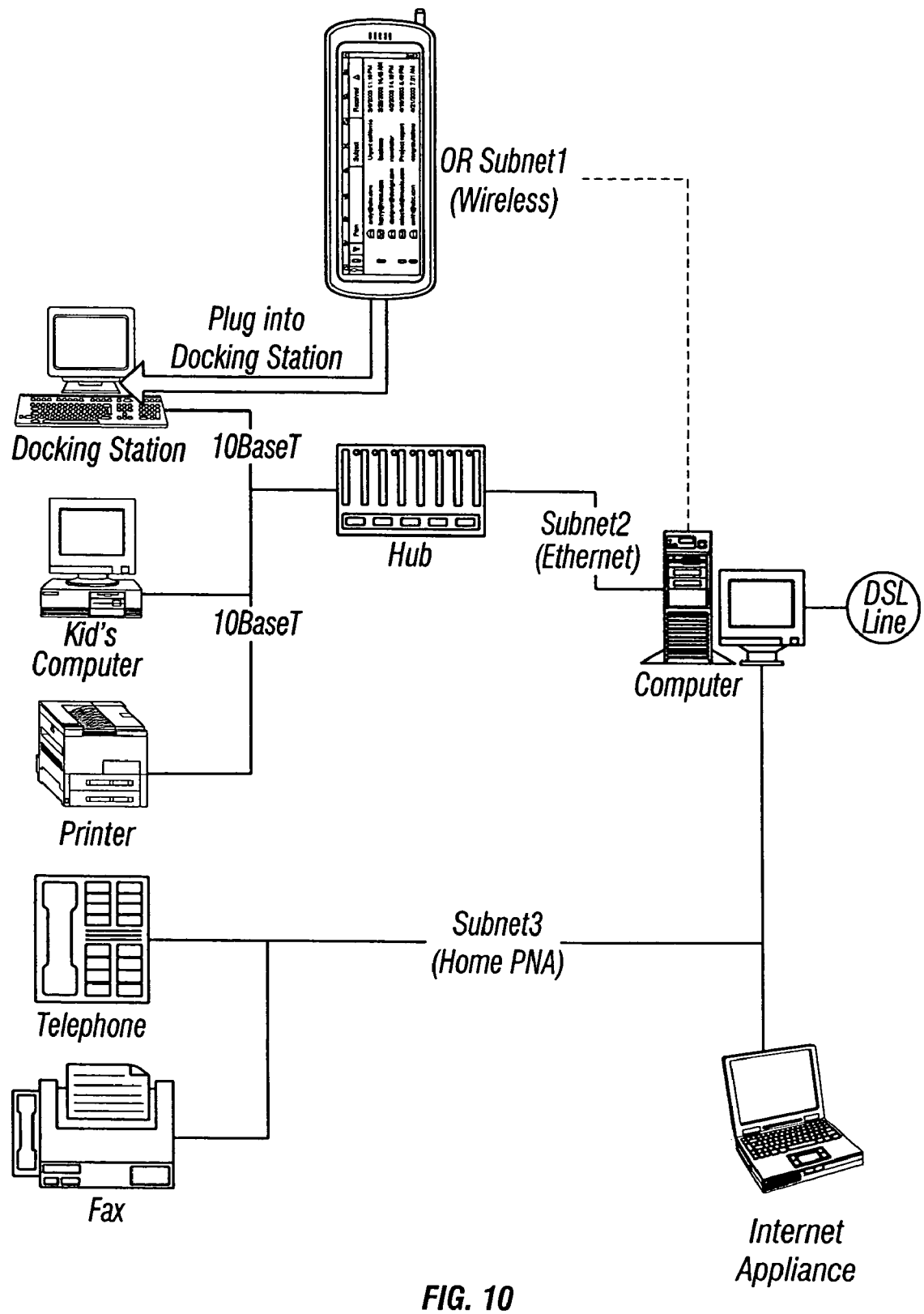
FIG. 10 is a block diagram depicting one embodiment of a home personal network which shows three network subnets such as wireless, Ethernet and phone line new alliance (PNA) and which includes one or more personal electronic devices.

FIG. 10 is a diagram of a home network, where there are several different network connectivity examples, such as a wireless 802.11 LAN, a standard Ethernet LAN and a home phone network alliance (PNA) all integrated into one solution for one home network.

E. Common Application Protocol

Figure 11:
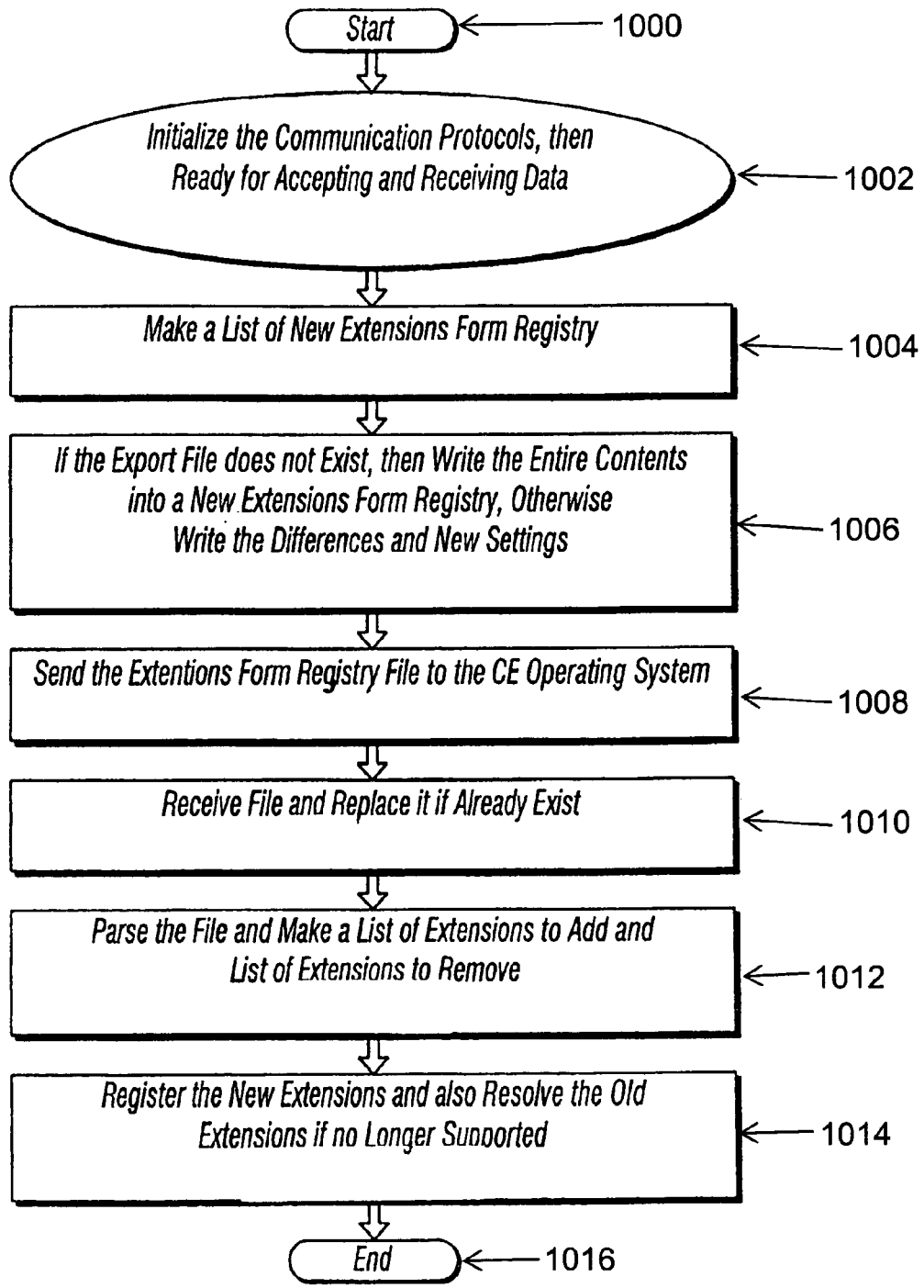
FIG. 11 is a flow chart showing how programs and data intended for use by the non-embedded processor are initially processed by the non-embedded processor and introduced to the embedded processor for storage in the embedded processor.
Figure 12:
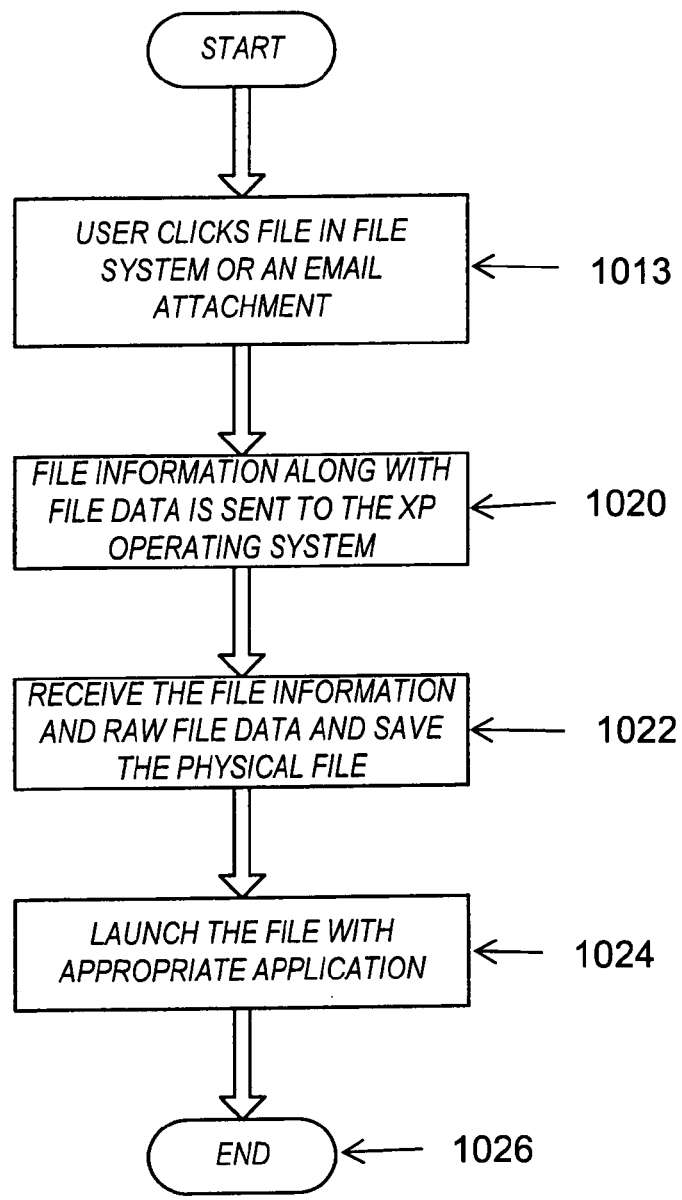
FIG. 12 is a flow chart showing how the programs and data stored in the embedded processor are transferred to the non-embedded processor for use by the non-embedded processor when the non-embedded processor is awakened and activated.
Figure 13:
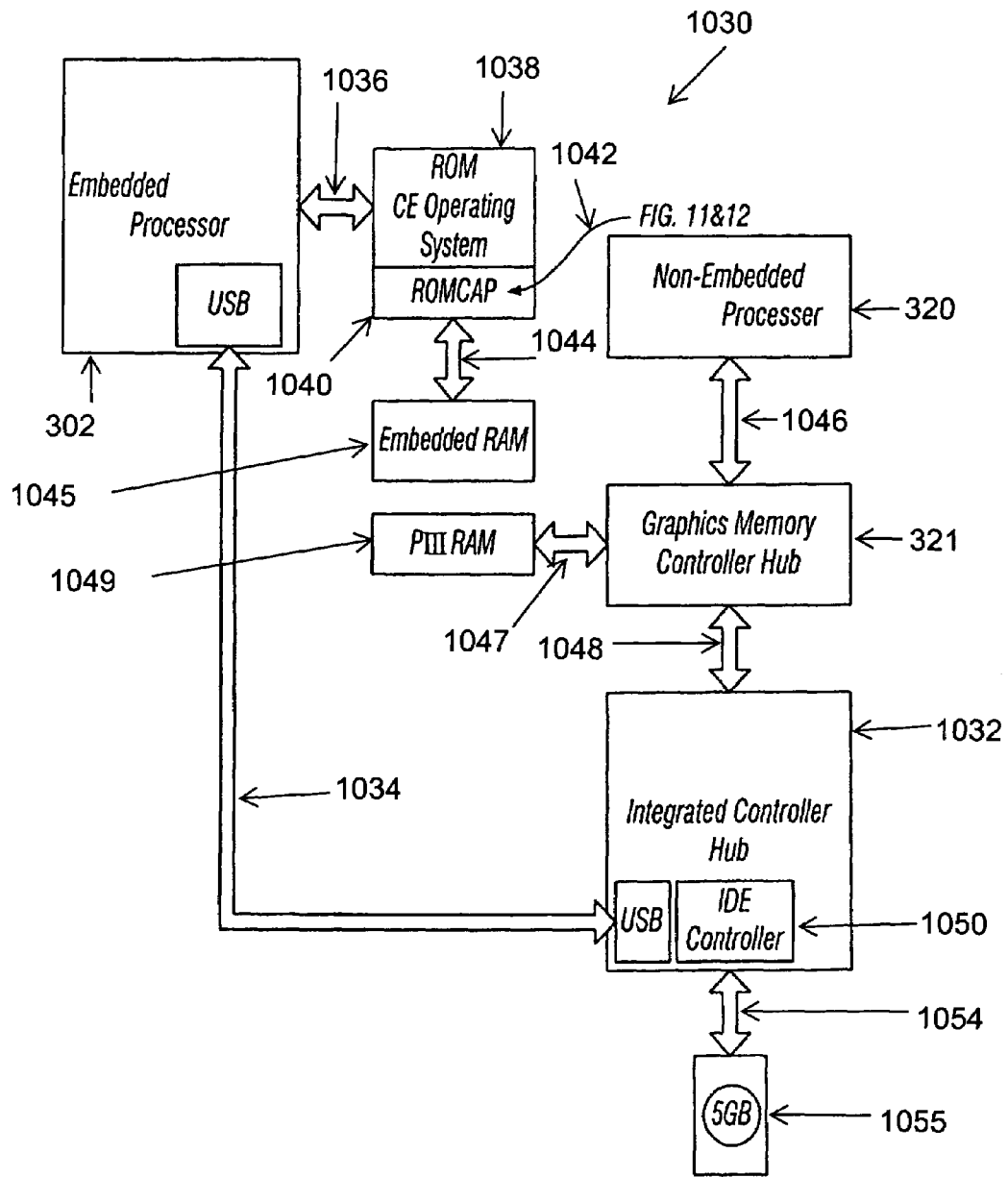
FIG. 13 is a circuit diagram, primarily in block form, showing how stages associated with the embedded and non-embedded processors (a) initially introduce the programs and data to the non-embedded processor, (b) process the programs and data introduced to the non-embedded processor, (c) introduce the processed programs and data to the embedded processor for storage, and (d) thereafter transfer the processed programs and data to the non-embedded processor when the non-embedded processor is awakened and activated to perform the functions represented by the program.

FIGS. 11 and 12 provide common application protocol (CAP) diagrams which constitute flow charts showing the successive steps in a method constituting this invention when this method is used in or with the system shown in FIGS. 1–10. FIG. 13 schematically shows hardware including this invention when the hardware is included in the system shown in FIGS. 1–12.

FIG. 11 shows a common application protocol (CAP) initialization and table association update for introducing-protocols to the non-embedded processor 320, processing the protocols and introducing the processed protocols to the embedded processor 302. The start of the process is indicated at 1000 in FIG. 11. As a first step, a non-embedded processor such as the non-embedded WINDOWS XP® processor 320 initializes the communication protocols and makes the processor ready for accepting and receiving data. This is indicated at 1002 in FIG. 11.

The non-embedded (e.g., WINDOWS XP®) processor 320 then makes a list of new extension form registry as indicated at 1004 in FIG. 11. These extensions are for associating the extensions with file types, for example .doc may be associated with MICROSOFT® WORD files. The extension form registry provides a new application protocol, which is defined by a series of programs or modifiers it provides extensions or modifications of an application protocol. If the extension form registry does not exist so that the application protocol is new, the non-embedded processor 320 writes the entire contents of the file into a new extension form registry. If the extension form registry does exist, the non-embedded processor 320 writes the difference between the new extension form registry and the existing extension form registry and the new settings for the extension form registry. This is indicated at 1006 in FIG. 11.

The non-embedded processor 320 then sends the extension form registry file to the embedded (e.g., WINDOWS CE®) processor 302 (see 1008). The embedded processor 302 receives the extension form registry file. If the extension form registry file already exists at the embedded processor 302, the embedded processor 302 removes the existing file and replaces it with the file which the processor has just received. This is indicated at 1010 in FIG. 11.

The embedded processor 302 then parses the file and makes a list of extensions to add and a list of extensions to remove (see 1012 in FIG. 11). The embedded processor subsequently registers the new extensions and resolves the old extensions if these extensions are no longer supported (as indicated at 1014 in FIG. 11). The flow chart in FIG. 11 is ended at 1016.

FIG. 12 is a flow chart indicating the successive steps which are performed when the non-embedded processor 320 is to perform the protocols of the extension form registry recorded in the embedded processor 302 in accordance with the steps shown in FIG. 11 and described above. The start of the successive steps is indicated at 1017.

The user of the embedded processor 302 initially clicks in a file in the processor file system or an email attachment as indicated at 1013. The embedded processor 302 then sends to the non-embedded processor 320 the information in the file and the data relating to the file (see 1020). The non-embedded processor receives the file information and the new file data and saves the physical file (see 1022). The non-embedded processor 320 then launches (1024) the file with the appropriate extension form registry application. This is the end 1026 of the steps shown in FIG. 12.

FIG. 13 shows the hardware, generally indicated at 1030, for providing the method steps shown in FIGS. 11 and 12. The hardware 1030 includes the embedded processor 302, the non-embedded processor 320 and integrated controllers 1032. A universal serial bus 1034 extends between the processor 302 and the integrated controllers 1032.

A bus 1036 is connected between the embedded processor 302 and a read-only memory 1038 for the embedded processor operating system. Since the processor 302 is embedded, the read-only memory for the processor provides a permanent record of the programs to be operated by the processor. A read-only memory common application protocol (ROMCAP) 1040 is also provided for the embedded processor 302. As previously described, the common application protocol 1040 provides information to the embedded processor 302 in accordance with the steps in the flow chart shown in FIG. 11 and described above. This is represented by an arrow 1042. A bus 1044 extends between the ROMCAP 1040 and an embedded random access memory (RAM) 1045. The embedded RAM 1045 contains the new embedded extension form registry.

A bus 1046 extends between the non-embedded processor 320 and a hub for the graphic memory controller 321 shown in FIGS. 3B–C. As indicated above, the non-embedded processor 320 provides display information to the display 307 in FIGS. 3B–C by way of the memory and graphics controller 321. As also indicated above and as shown in FIGS. 3B–C, the embedded processor 302 and the non-embedded processor 320 may access the memory and storage module 385 via memory and graphics controller 321.

A bus 1047 extends between the graphic memory and controller hub 321 and a random access memory (RAM) 1049. The RAM 1049 provides volatile data which is erased when the non-embedded processor 320 is put to sleep. A bus 1048 also extends between the graphics memory and controller hub 321 and the integrated controller hub 1032. The integrated controller hub 1032 may include several different controller hubs including the display controller 308 and the controller and I/O module 322 and a controller 1050 for a hard disk drive. A bus 1054 extends between the graphics memory and controller hub 321 and a 5GB drive 1055.

F. Conclusion

All publications and patent applications mentioned in this specification are herein incorporated by reference to the same extent as if each individual publication or patent application was specifically and individually indicated to be incorporated by reference. The invention having been fully described and including the best mode known to the inventors, it will be apparent to one of ordinary skill in the art that many changes and modifications can be made thereto while remaining within the spirit or scope of the appended claims.

The invention claimed is:

1. A personal portable electronic device to perform a plurality of functions, the device comprising:
a hand-held source of energy,
an embedded system processor energized by the source of energy for performing a first subset of the plurality of functions, with the functions of the first subset being of limited complexity,
a non-embedded system processor energized by the source of energy for performing a second subset of the plurality of functions, with the functions of the second subset being more complex than those associated with the first subset of functions,
the embedded system processor controlling the allocation and termination of energy to, as well as the operation of the non-embedded system processor, and
a hard disc drive providing a resource shared by the embedded system processor and the non-embedded system processor to provide for systems processors a storage capacity variable to each of the system processors for an amount of storage dependent at each instant upon the functions being performed by the systems processors at that instant.

2. In connection as set forth in claim 1 wherein
the hard disc drive includes a first portion available for storage of information for the non-embedded system processor and includes a second portion available for storage jointly for the embedded system processor and the non-embedded system processor dependent upon the relative storage requirements of the embedded system processor and the non-embedded system processor.

3. In combination in a personal portable electronic device,
a hand-held source of energy,
a first system processor enabled by the hand-held source of energy and constructed to perform relatively simple functions,
a second system processor enabled by the hand-held source of energy and constructed to perform functions more complex than those performed by the first system processor,
the allocation and termination of energy to, as well as the operation of the second system processor being controlled by the first system processor independently of the operation of the second system processor, and
a hard disc drive operatively coupled to the first system processor and the second system processor for storing information individual to the first system processor for processing by the first system processor and individual to the second processor for processing by the second system processor.

4. In a combination as set forth in claim 3 wherein the amount of information stored in the hard disc for processing by the first system relative to the amount of information stored in the hard disc drive for processing by the second system processor is dependent upon the relative storage needs of the first system processor and the second system processor.

5. In a combination as set forth in claim 3, wherein a portion of the hard disc drive stores information for processing only by the second system processor and wherein the remainder of the hard disc drive stores information for processing by the first system processor and information for processing by the second system processor.

6. In a combination as set forth in claim 5 wherein the portion of the hard disc drive storing the information for processing by the second system processor constitutes a first portion and wherein
a second portion of the hard disc drive includes a third portion for storing information for processing by the first system processor and a fourth portion for processing by the second system processor, the paced in the third and fourth portions being variable dependent upon the relative needs of the first system processor and the second system processor for storing information.

7. In a combination as set forth in claim 6 wherein the relative amount of space in the third portion of the hard disc drive relative to the amount of space in the fourth portion of the hard disc drive is dependent at each instant upon the relative storage needs of the first system processor and the second system processor at that instant.

8. In combination,
a housing,
a hand-held source of energy within the housing,
a device disposed within the housing and including first and second system processors energized by the source of energy,
the first system processor being constructed to perform relatively simple functions and the second system processor being constructed to perform functions more complex than the relatively simple functions, the allocation and termination of energy to, as well as the operation of the second system processor being controlled by the first system processor without instructions from the second system processor,
a host computer disposed outside of the housing,
a cable extending between the device and the host computer to provide for the operation of the device as a hard disc drive for introducing information to the host computer, and
connectors extending at opposite ends respectively from the cable to the device and from the cable to the host computer to provide for the introduction of information to the host computer from the device operating as a hard disc drive.

9. In a combination as set forth in claim 8 wherein
the connector on the host computer is designed to emulate a type A USB connector and wherein connector on the device is designed to emulate a type B USB connector.

10. In a combination as set forth in claim 9 wherein
the hard disc drive within the device stores information in a first portion of the hard disc drive for the first system processor and stores information in a second portion of the hard disc drive for the second system processor and wherein
the relative sizes of the first and second portions of the hard disc drive within the device are dependent upon the storage needs of the first and second system processors.

11. In a combination as set forth in claim 8 wherein
a priority connector on the device is connected to a port replicator and wherein
a USB type B connector is connected at one end to the post replicator and at the other end via a standard USB cable to a USB type A connector on the host computer.

12. In a combination as set forth in claim 8 wherein
the device provides a function layer within the device and wherein
the host computer provides client software within the host computer,
thereby to connect the device to the host computer and have the device operate as a hard disc drive for the host computer.

13. In a combination as set forth in claim 8 wherein
the device operates as a first hard disc drive to provide information to the host computer and wherein
a hard disc drive is provided within the device to store information for the first system processor and the second system processor.

14. In a combination as set forth in claim 13 wherein
the relative sizes of the first and second portions of the hard disc drive within the device are variable at each instant dependent upon the storage needs of the first and second system processors at that instant.

15. In a combination as set forth in claim 13 wherein the housing has a hand-held size.

16. In a combination as set forth in claim 8 wherein
the housing has a hand-held size.

17. In combination,
a housing,
a hand-held source of energy disposed within the housing,
a device including first and second system processors disposed within the housing and energized by the source of energy, the first system processor being constructed to perform relatively simple functions and the second system processor being constructed to perform functions more complex than those performed by the first system processor, the first system processor being constructed to operate independently of the second system processor in controlling the allocation and termination of energy to, as well as the operation of the second system processor,
a first hard disc drive disposed within the housing and coupled to the first and second system processors respectively to provide variable amounts of storage capacity to the first and second system processors, the storage capacity provided to each of the first and second system processors being dependent at each instant upon the storage needs of the system processor at that instant, and
a host computer disposed outside of the housing,
the device being connected outside of the housing to the host computer to operate as a second hard disc drive in providing information to the host computer.

18. In a combination as set forth in claim 17 wherein
the first hard disc drive has a first portion for storing information for use by the second system processor and has a second portion for storing information for use by the first and second system processors.

19. In a combination as set forth in claim 18 wherein
the second portion of the first hard disc drive includes third and fourth portions,
the third portion being provided for storing information for use by the first system processor and the fourth portion being provided for storing information for use by the second system processor.

20. In a combination as set forth in claim 19 wherein
the relative sizes of the third and fourth portions of the first hard disc drive are dependent upon the relative needs of the first and second system processors for storing information for use respectively by the first and second system processors.

21. In a combination as set forth in claim 20 wherein
the relative sizes of the third and fourth portions of the hard disc drive at each instant are dependent upon the relative needs of the first and second system processors at that instant for storing information respectively for use by the firs and second system processors.

22. In a combination as set forth in claim 17, including
circuitry extending between the device and the host computer to provide for the operation of the device as a hard disc drive for introducing information for them device to the host computer, and
connectors connecting the circuitry to the device and to the host computer.

\* \* \* \* \*